(12) United States Patent
Ohashi

(10) Patent No.: US 7,677,820 B2
(45) Date of Patent: Mar. 16, 2010

(54) PRINTING SUPPORTING APPARATUS, PRINTING APPARATUS SELECTING APPARATUS, PRINTING SUPPORTING PROGRAM, PRINTING APPARATUS SELECTING PROGRAM, STORAGE MEDIUM, METHOD OF SELECTING PRINTING APPARATUS, METHOD OF SUPPORTING PRINTING, AND METHOD OF CREATING PRINTING APPARATUS DETERMINING TREE

(75) Inventor: Hirotaka Ohashi, Suwa (JP)

(73) Assignee: Seiko Epson Corporation (JP)

( * ) Notice: Subject to any disclaimer, the term of this patent is extended or adjusted under 35 U.S.C. 154(b) by 884 days.

(21) Appl. No.: 11/457,325

(22) Filed: Jul. 13, 2006

(65) Prior Publication Data

US 2007/0014613 A1 Jan. 18, 2007

(30) Foreign Application Priority Data

Jul. 14, 2005 (JP) ............................. 2005-205754
Jul. 26, 2005 (JP) ............................. 2005-215472
Apr. 13, 2006 (JP) ............................. 2006-110707

(51) Int. Cl.
*B41J 5/30* (2006.01)
(52) U.S. Cl. ............................. 400/62; 399/82; 399/83; 399/87; 399/45
(58) Field of Classification Search ................... 399/82, 399/83, 87, 45; 400/62
See application file for complete search history.

(56) References Cited

U.S. PATENT DOCUMENTS

| 5,129,639 | A | * | 7/1992 | DeHority | ................... 270/1.01 |
| 6,748,858 | B2 | * | 6/2004 | Yamaguchi | ................. 101/232 |
| 7,124,094 | B1 | * | 10/2006 | Kobayashi et al. | ............ 705/26 |
| 2002/0026379 | A1 | * | 2/2002 | Chiarabini et al. | ............ 705/26 |

FOREIGN PATENT DOCUMENTS

| JP | 06-110629 | 4/1994 |
| JP | 2003-122524 | 4/2003 |

* cited by examiner

*Primary Examiner*—Ren Yan
*Assistant Examiner*—Matthew G Marini
(74) *Attorney, Agent, or Firm*—Harness, Dickey & Pierce, P.L.C.

(57) ABSTRACT

A print support apparatus includes: a unit acquiring printing specification information; a unit acquiring printing apparatus information indicating capabilities of printing apparatuses; a unit selecting a printing apparatus as a printing destination based on the printing specification information and the printing apparatus information; a unit acquiring document data associated with the printing specification information; a unit processing the acquired document data based on printing apparatus information indicating a capability of the selected printing apparatus and the acquired printing specification information; a unit creating printing setting information including a printing setting of the selected printing apparatus based on the acquired printing specification information; and a unit requiring printing of the selected printing apparatus based on the created printing setting information and the processed document data.

14 Claims, 21 Drawing Sheets

```
<ENTIRE SPECIFICATION>
  <PAPER SIZE> A4 </PAPER SIZE>
  <THE NUMBER OF COPIES> 5 </THE NUMBER OF COPIES>
  <COVER SPECIFICATION>
    <PAPER KIND> GLOSSY PAPER </PAPER KIND>
    <DOUBLE-SIDE PRINTING> SINGLE-SIDE PRINTING </DOUBLE-SIDE PRINTING>
    <COLOR> CMYK </COLOR>
    <PRINTING DATA>
      <FILE> ELECTRONIC FILE 1 </FILE>
      <PAGE DESIGNATION> 1 </PAGE DESIGNATION>
    </PRINTING DATA>
  </COVER SPECIFICATION>
  <TEXT SPECIFICATION>
    <PAPER KIND> COMMON PAPER </PAPER KIND>
    <DOUBLE-SIDE PRINTING> DOUBLE-SIDE PRINTING </DOUBLE-SIDE PRINTING>
    <BINDING LOCATION> LEFT </BINDING LOCATION>
    <COLOR> MONOCHROME </COLOR>
    <PRINTING DATA>
      <FILE> ELECTRONIC FILE 1</FILE>
      <PAGE DESIGNATION> 2·10 </PAGE DESIGNATION>
    </PRINTING DATA>
  </TEXT SPECIFICATION>
</ENTIRE SPECIFICATION>
```

FIG. 3

| FIELD | CONTENT |
|---|---|
| PAPER SIZE | A3, A4, A5, B4, B5, CARD, L PLATE |
| PAPER KIND | COMMON PAPER, MAT PAPER, COAT PAPER, GLOSSY PAPER |
| DOUBLE-SIDE PRINTING | DOUBLE SIDE, SINGLE SIDE |
| PRINTING QUALITY | HIGH RESOLUTION, COMMON, DRAFT |
| PRINTING SPEED | FAST, COMMON, SLOW |
| COLOR | CMYK, MONOCHROME |
| STAPLER | EXISTENCE, NONEXISTENCE |

FIG. 4

```
<ENTIRE SETTING>
  <PAPER SIZE> A4 </PAPER SIZE>
  <THE NUMBER OF COPIES> 5 </THE NUMBER OF COPIES>
  <USED APPARATUS> PRINTING APPARATUS 1 </USED APPARATUS>
  <PAPER KIND> GLOSSY PAPER </PAPER KIND>
  <PAPER FEEDING TRAY> AUTOMATIC SHEET FEEDER </PAPER FEEDING TRAY>
  <DOUBLE-SIDE PRINTING> SINGLE-SIDE PRINTING </DOUBLE-SIDE PRINTING>
  <COLOR> CMYK </COLOR>
  <PRINTING DATA>
    <FILE> ELECTRONIC FILE 1' </FILE>
  </PRINTING DATA>
  <PRINTING QUALITY> HIGH RESOLUTION </PRINTING QUALITY>
</ENTIRE SETTING>
```

```
<ENTIRE SETTING>
  <PAPER SIZE> A4 </PAPER SIZE>
  <THE NUMBER OF COPIES> 5 </THE NUMBER OF COPIES>
  <USED APPARATUS> PRINTING APPARATUS 2 </USED APPARATUS>
  <PAPER KIND> COMMON PAPER </PAPER KIND>
  <PAPER FEEDING TRAY> TRAY 1 </PAPER FEEDING TRAY>
  <DOUBLE-SIDE PRINTING> DOUBLE-SIDE PRINTING </DOUBLE-SIDE PRINTING>
  <COLOR> MONOCHROME </COLOR>
  <PRINTING DATA>
    <FILE> ELECTRONIC FILE 1" </FILE>
  </PRINTING DATA>
  <PRINTING QUALITY> COMMON </PRINTING QUALITY>
</ENTIRE SETTING>
```

FIG. 5

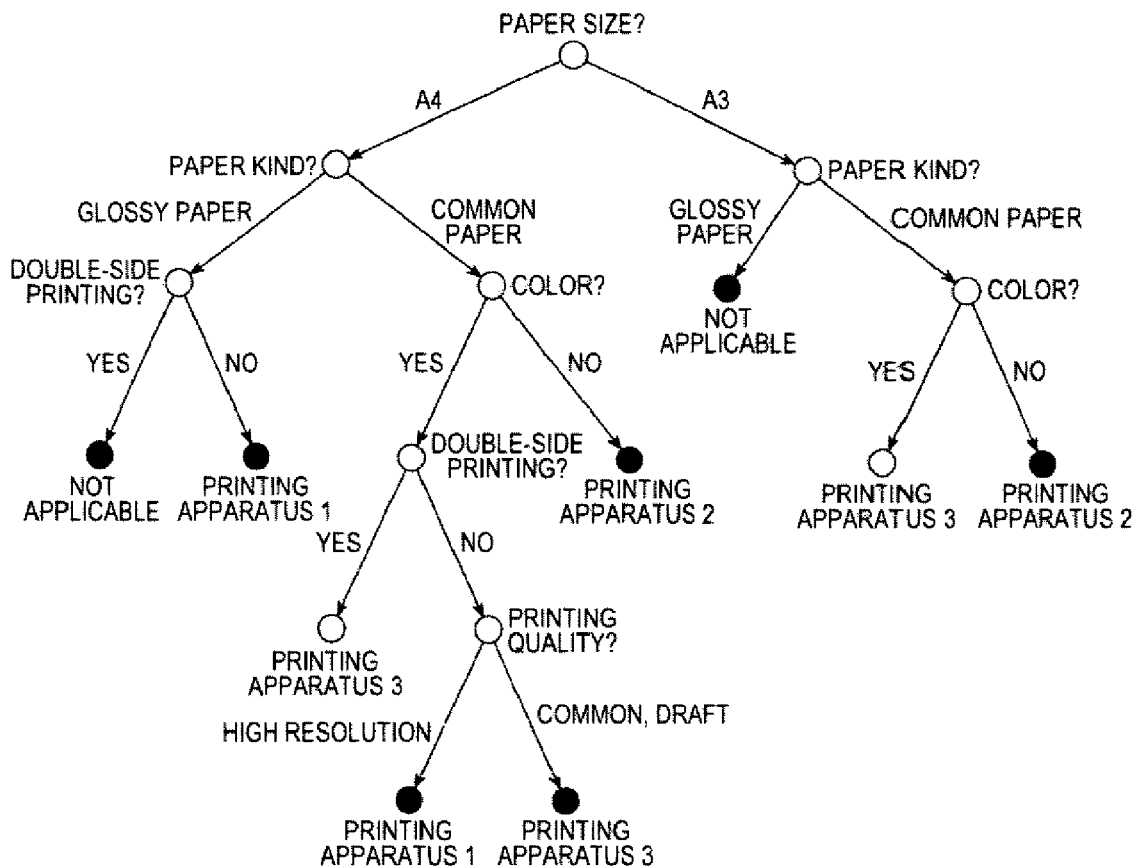

| PRINTING APPARATUS 1 | CONTENT |
|---|---|
| PAPER SIZE | A4, A5, B5. CARD, L PLATE |
| PAPER KIND | COMMON PAPER, MAT PAPER, GLOSSY PAPER |
| DOUBLE-SIDE PRINTING | SINGLE SIDE |
| PRINTING QUALITY | HIGH RESOLUTION |
| PRINTING SPEED | SLOW |
| COLOR | CMYK |
| STAPLER | NONE |

| PRINTING APPARATUS 2 | CONTENT |
|---|---|
| PAPER SIZE | A3, A4, A5, B4, B5 |
| PAPER KIND | COMMON PAPER |
| DOUBLE-SIDE PRINTING | DOUBLE SIDE |
| PRINTING QUALITY | COMMON, DRAFT |
| PRINTING SPEED | FAST |
| COLOR | MONOCHROME |
| STAPLER | EXIST |

| PRINTING APPARATUS 3 | CONTENT |
|---|---|
| PAPER SIZE | A3, A4, A5, B4, B5 |
| PAPER KIND | COMMON PAPER |
| DOUBLE-SIDE PRINTING | DOUBLE SIDE |
| PRINTING QUALITY | COMMON, DRAFT |
| PRINTING SPEED | COMMON |
| COLOR | CMYK |
| STAPLER | EXIST |

FIG. 6

```
<ENTIRE SPECIFICATION>
  <PAPER SIZE> A4 </PAPER SIZE>
  <THE NUMBER OF COPIES> 1 </THE NUMBER OF COPIES>
  <TEXT SPECIFICATION>
    <PAPER KIND> GLOSSY PAPER </PAPER KIND>
    <DOUBLE-SIDE PRINTING> DOUBLE-SIDE PRINTING </DOUBLE-SIDE PRINTING>
    <COLOR> CMYK </COLOR>
    <PRINTING DATA>
      <FILE> ELECTRONIC FILE 1 </FILE>
      <PAGE DESIGNATION> 1-12 </PAGE DESIGNATION>
    </PRINTING DATA>
  </TEXT SPECIFICATION>
```

FIG. 9

```
<ENTIRE SETTING>
  <PAPER SIZE> A4 </PAPER SIZE>
  <THE NUMBER OF COPIES> 1 </THE NUMBER OF COPIES>
  <USED APPARATUS> PRINTING APPARATUS 1 </USED APPARATUS>
  <PAPER KIND> GLOSSY PAPER </PAPER KIND>
  <PAPER FEEDING TRAY> AUTOMATIC SHEET FEEDER </PAPER FEEDING TRAY>
  <DOUBLE-SIDE PRINTING> SINGLE-SIDE PRINTING </DOUBLE-SIDE PRINTING>
  <COLOR> CMYK </COLOR>
  <PRINTING DATA>
    <FILE> SURFACE FILE </FILE>
  </PRINTING DATA>
  <PRINTING QUALITY> HIGH RESOLUTION </PRINTING QUALITY>
</ENTIRE SETTING>
```

```
<PRINTING CONTROL INSTRUCTION>
  <MESSAGE DISPLAY>
    <MESSAGE> PLEASE REVERSE DISCHARGED PAPER AND SUPPLY PAPER AGAIN.
    </MESSAGE>
  </MESSAGE DISPLAY>
</PRINTING CONTROL INSTRUCTION>
```

```
<ENTIRE SETTING>
  <PAPER SIZE> A4 </PAPER SIZE>
  <THE NUMBER OF COPIES> 1 </THE NUMBER OF COPIES>
  <USED APPARATUS> PRINTING APPARATUS 1 </USED APPARATUS>
  <PAPER KIND> GLOSSY PAPER </PAPER KIND>
  <PAPER FEEDING TRAY> AUTOMATIC SHEET FEEDER </PAPER FEEDING TRAY>
  <DOUBLE-SIDE PRINTING> SINGLE-SIDE PRINTING </DOUBLE-SIDE PRINTING>
  <COLOR> CMYK </COLOR>
  <PRINTING DATA>
    <FILE> REAR SURFACE FILE </FILE>
  </PRINTING DATA>
  <PRINTING QUALITY> HIGH RESOLUTION </PRINTING QUALITY>
</ENTIRE SETTING>
```

FIG.10

PLEASE REVERSE DISCHARGED PAPER
AND SUPPLY PAPER AGAIN.

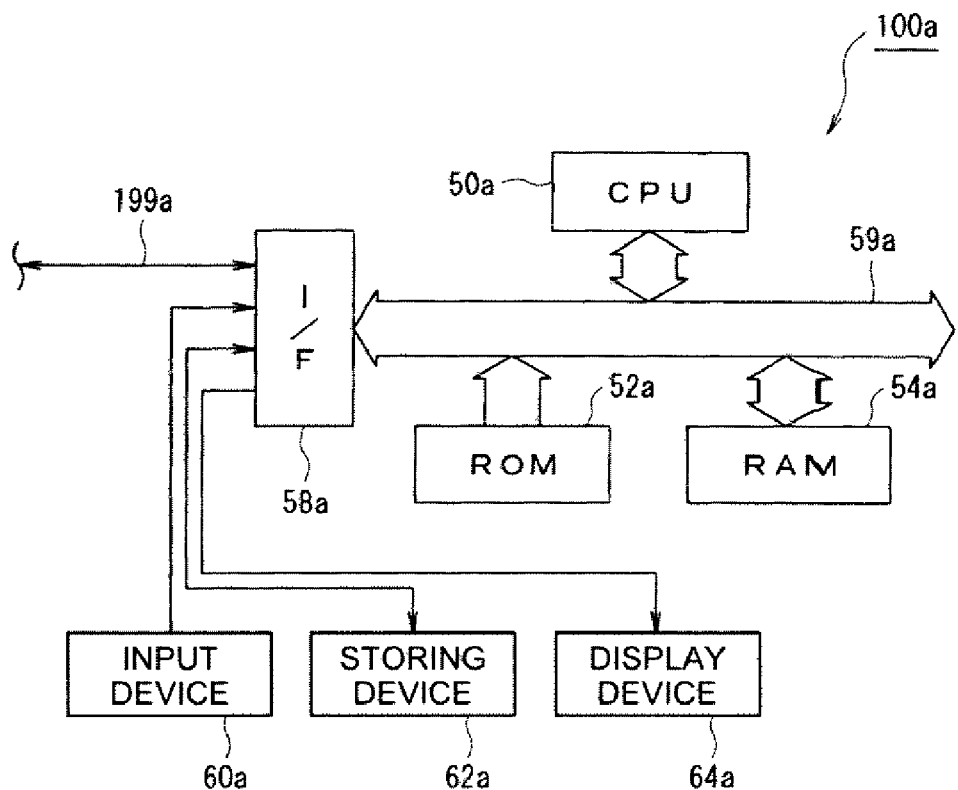

FIG.13

| FIELD | CONTENT |
|---|---|
| SPECIFICATION TICKET ID | JobIntent001 |
| FINISHING PAPER SIZE | A3, A4, B4, B5 |
| COLOR/MONOCHROME | COLOR, MONOCHROME |
| PAPER KIND | COMMON PAPER, REPRODUCING PAPER, GLOSSY PAPER, MAT PAPER |
| DOUBLE-SIDE PRINTING | NONE, EXIST (FlipX, FlipY) |
| PRINTING SPEED | 5ppm, 10ppm |
| PRINTING QUALITY | DRAFT, COMMON, HIGH RESOLUTION |
| BINDING METHOD | SIDE STITCHING, SADDLE STITCHING |
| BINDING LOCATION | LEFT, UP, RIGHT, DOWN |

FIG.14

| FIELD | CONTENT |
|---|---|
| SETTING TICKET ID | JobProcess001 |
| PRINTING APPARATUS | Printer01 |
| FEEDING PAPER SIZE | A3, A4, B5, B4 |
| COLOR/MONOCHROME | COLOR, MONOCHROME |
| PAPER KIND | COMMON PAPER, GLOSSY PAPER, MAT PAPER REPRODUCING PAPER |
| DOUBLE-SIDE PRINTING | EXIST, NONE |
| PRINTING SPEED | SLOW, COMMON, FAST |
| RESOLUTION | 300dpi, 600dpi |
| PAPER FOLDING | Fold-01 |
| PAPER BINDING | SIDE STITCHING, SADDLE STITCHING |

FIG.15

| FIELD | CONTENT |
|---|---|
| ATTRIBUTE ID | Attribute01 |
| DOCUMENT USAGE | BUSINESS TRIP EXPENSE APPLICATION |
| MINIMAL CHARACTER SIZE | 10pt |
| EXISTENCE OR NONEXISTENCE OF PHOTO IMAGE | NONE |

FIG.16

| DATE AND TIME | USER ID | ATTRIBUTE ID | SPECIFICATION TICKET ID | SETTING TICKET ID | SPECIFICATION COMPLETENESS |
|---|---|---|---|---|---|
| 2005-06-01-08:30 | userA | Attribute01 | JobIntent01 | JobProcess01 | Y |
| 2005-06-01-10:00 | userB | Attribute02 | JobIntent02 | JobProcess02 | N |
| 2005-06-01-17:15 | userC | Attribute03 | JobIntent03 | JobProcess03 | Y |
| 2005-06-03-12:00 | userC | Attribute01 | JobIntent02 | JobProcess04 | N |
| 2005-06-03-16:00 | userA | Attribute04 | JobIntent01 | JobProcess05 | N |
| 2005-06-04-09:00 | userA | Attribute01 | JobIntent01 | JobProcess01 | Y |

FIG.17

| FIELD | COLOR/ MONOCHROME | PAPER KIND | PAPER SIZE | DOUBLE-SIDE PRINTING | PRINTING QUALITY | PRINTING SPEED |
|---|---|---|---|---|---|---|
| PRINTING APPARATUS 1 | COLOR | GLOSSY PAPER, COMMON PAPER | A4 | NON-AVAILABLE | HIGH RESOLUTION, COMMON | SLOW |
| PRINTING APPARATUS 2 | MONOCHROME | COMMON PAPER | A3, A4 | AVAILABLE | HIGH RESOLUTION | SLOW |
| PRINTING APPARATUS 3 | COLOR | COMMON PAPER | A3, A4 | AVAILABLE | COMMON | FAST |
| PRINTING APPARATUS 4 | COLOR | COMMON PAPER | A3, A4 | NON-AVAILABLE | HIGH RESOLUTION | SLOW |
| PRINTING APPARATUS 5 | MONOCHROME | COMMON PAPER | A3, A4 | NON-AVAILABLE | COMMON | FAST |
| PRINTING APPARATUS 6 | MONOCHROME | GLOSSY PAPER, COMMON PAPER | A4 | NON-AVAILABLE | HIGH RESOLUTION, COMMON | FAST |
| PRINTING APPARATUS 7 | COLOR | GLOSSY PAPER, COMMON PAPER | A4 | NON-AVAILABLE | COMMON | FAST |

FIG.18

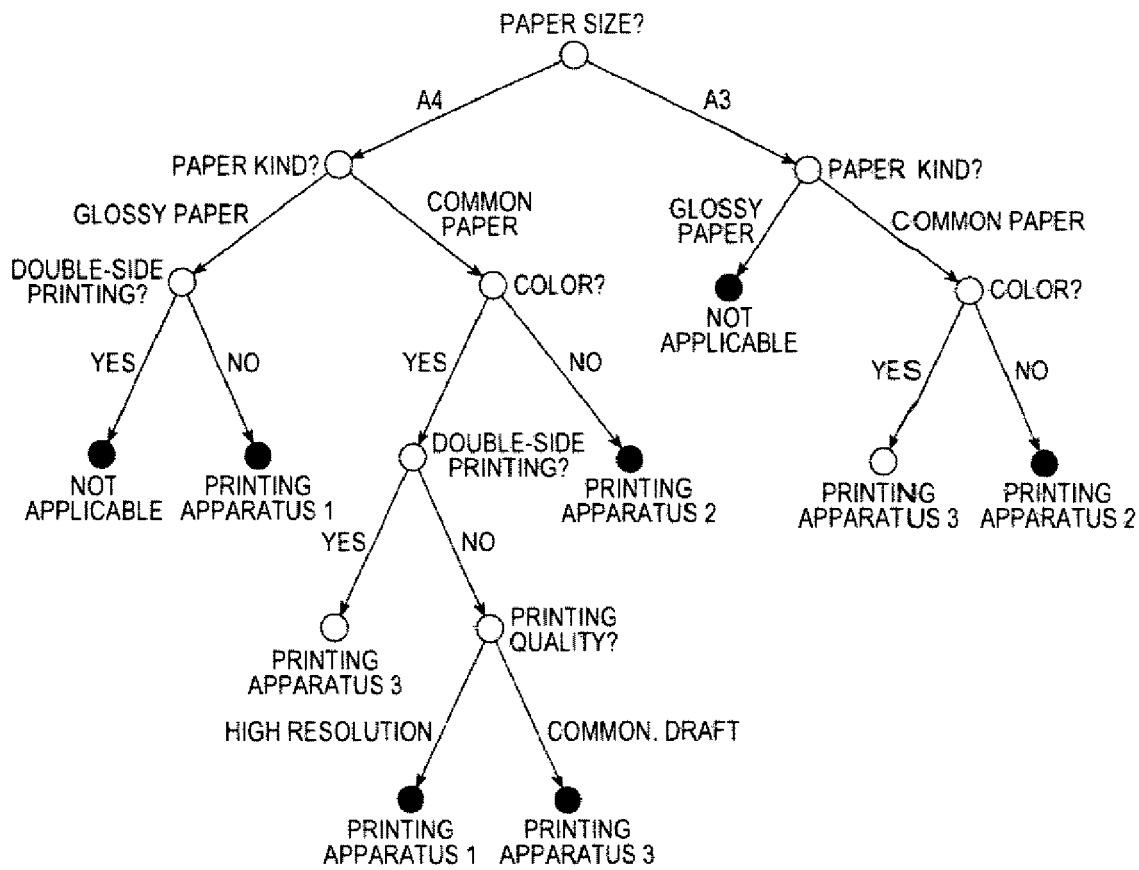

| PRINTING APPARATUS 1 | CONTENT |
|---|---|
| PAPER SIZE | A4, A5, B5, CARD, L PLATE |
| PAPER KIND | COMMON PAPER, MAT PAPER, GLOSSY PAPER |
| DOUBLE-SIDE PRINTING | SINGLE SIDE |
| PRINTING QUALITY | HIGH RESOLUTION |
| PRINTING SPEED | SLOW |
| COLOR | CMYK |
| STAPLER | NONE |

| PRINTING APPARATUS 2 | CONTENT |
|---|---|
| PAPER SIZE | A3, A4, A5, B4, B5 |
| PAPER KIND | COMMON PAPER |
| DOUBLE-SIDE PRINTING | DOUBLE SIDE |
| PRINTING QUALITY | COMMON, DRAFT |
| PRINTING SPEED | FAST |
| COLOR | MONOCHROME |
| STAPLER | EXIST |

| PRINTING APPARATUS 3 | CONTENT |
|---|---|
| PAPER SIZE | A3, A4, A5, B4, B5 |
| PAPER KIND | COMMON PAPER |
| DOUBLE-SIDE PRINTING | DOUBLE SIDE |
| PRINTING QUALITY | COMMON, DRAFT |
| PRINTING SPEED | COMMON |
| COLOR | CMYK |
| STAPLER | EXIST |

FIG.24

PRINTING SUPPORTING APPARATUS, PRINTING APPARATUS SELECTING APPARATUS, PRINTING SUPPORTING PROGRAM, PRINTING APPARATUS SELECTING PROGRAM, STORAGE MEDIUM, METHOD OF SELECTING PRINTING APPARATUS, METHOD OF SUPPORTING PRINTING, AND METHOD OF CREATING PRINTING APPARATUS DETERMINING TREE

BACKGROUND

1. Technical Field

The present invention relates to a print support apparatus that prints based on an electronic job ticket, to a print support program, and to a method of supporting printing. More particularly, the invention relates to a print support apparatus that is capable of acquiring specifications for a printed material and properly selecting a printing apparatus according to the priority of a printing setting, to a printing apparatus selecting apparatus, to a print support program, to a printing apparatus selecting program, to a storage medium, to a method of selecting a printing apparatus, to a method of supporting printing, and to a method of creating a printing apparatus determining tree.

2. Related Art

In order for a drafter of a document to obtain a printing material according to a desired specification, a technology has been known in which an electronic job ticket that is different from the document data to be printed is created, and printing is performed based on the electronic job ticket and the document data. For example, as the electronic job ticket, printing material including finishing information such as a binding location or the like are defined, in addition to format information, such as a paper size, a printing direction, allocation setting, and existence or nonexistence of double-side printing.

Generally, as technologies for performing printing using an electronic job ticket, for example, a digital information output system is disclosed in JP-A-2003-122524 and a printing system is disclosed in JP-A-6-110629.

In the digital information output system disclosed in JP-A-2003-122524, a host terminal and a plurality of printers are connected to each other through a network. The host terminal selects a printer, creates a processing output instruction of digital information, and investigates a process capability of the output destination thereof. According to the result, the host terminal analyzes the processing output instruction of the digital information, processes the digital information according to the analyzed result, and transmits the digital information, a processing output instruction of the digital information, or the processed digital information to the printer that is the selected output destination according to the process capability of the printer. A first printer analyzes a processing output instruction of the transmitted digital information, processes the digital information according to the analyzed result, and outputs the processed digital information. A second printer outputs the digital information processed by the host terminal.

In the printing system disclosed in JP-A-6-110629, a printing apparatus is selected by using a printing apparatus determining tree for determining the printing apparatus. First, the combination of printing job selection fields is programmed by a user in UI, and inserted in a parameter block. In a case in which the parameter and the printing apparatus determining tree are compared with each other and the printing job selection fields of the allowed combination are programmed, the corresponding job ticket is transmitted to one of several printing queues. In contrast, in a case in which the printing selection fields of the combination not having been allowed are programmed, a failure message is transmitted from a test device to the UI, and the user is informed of the fact that the selection not having been allowed is performed.

However, according to the technology disclosed in JP-A-2003-122524, there are the following problems.

According to the technology disclosed in JP-A-2003-122524, a usable device is not limited, and a printer becoming an output destination is arbitrarily selected. However, in a case in which a monochrome printer is selected as an output destination of document data to be printed in color or a printer corresponding to A4 is selected as an output destination of document data to be printed in A3, it is not possible to achieve printing material. For example, in a case in which only two printers including a color printer corresponding to A4 and a monochrome printer corresponding to A3 can be used, when document data of a cover of a first page is printed in A4 and color and document data of the text of the next pages including a second page is printed in A3 and monochrome, even though any printer is selected, it is not possible to achieve a specification of the printing material by one printer.

Further, according to the technology disclosed in JP-A-6-110629, there are the following problems.

FIG. 24 is a diagram illustrating a logical structure of a printing apparatus determining tree.

As shown in FIG. 24, the printing apparatus determining tree includes associating a plurality of printing settings with one another in a tree and associating printing apparatuses with terminal nodes of the plurality of printing settings. In FIG. 24, as a printing setting, the priority order is assigned in the order of paper sizes, paper kinds, existence or nonexistence of color printing, existence or nonexistence of double-side printing, and printing quality, and the tree is constructed in the high priority order. The respective printing apparatuses are associated with the terminal nodes of the printing setting which they can process. For example, in the printing apparatus determining tree, a printing apparatus 1 that can achieve a specification of a paper size 'A4', a paper kind 'glossy paper', and single-side printing forms paths in the order of 'A4', 'glossy paper', and 'single-side printing' in a most significant node, and it is associated with the terminal node of the corresponding printing setting.

In order to achieve the specifications for the printed material, in a case in which a paper size 'A4', a paper kind 'glossy paper', and single-side printing are set as the printing setting, the paths are traced in the same sequence, and the printing apparatus 1 of the reached terminal node is selected. Further, in a case in which a paper size 'A4', a paper kind 'glossy paper', and double-side printing are set as the printing setting, the paths are traced in the same sequence. However, since the printing apparatus is not associated with the reached terminal node, the printing apparatus 1 of the most neighboring node (the closest terminal node) is selected. Accordingly, in a case in which the printing apparatus is not associated with the terminal node of the path of the necessary printing setting, one field of necessary printing settings is abandoned.

However, in a case in which the priority order for each necessary printing setting is different, it is not preferable to select the printing apparatus associated with the most neighboring node. In the above example, single-side printing is substituted for double-side printing. However, if the priority order of double-side printing is higher than the priority order of the paper kind, it is preferable to select a printing apparatus 3 in which the specification of a paper size 'A4', a paper kind 'common paper', and double-side printing can be achieved.

Further, according to the technology disclosed in JP-A-6-110629, when the printing selection fields of the combination not having been allowed are programmed, only a failure message is presented, and thus it is not possible to achieve a specification of the printing material.

SUMMARY

An advantage of some aspects of the invention is that it provides a print support apparatus that is capable of printing and properly selects a printing apparatus according to the priority order of printing settings. The invention also provides a printing apparatus selecting apparatus, a print support program, a printing apparatus selecting program, a storage medium, a method of selecting a printing apparatus, a method of supporting printing, and a method of creating a printing apparatus determining tree.

According to a first aspect of the invention, there is provided a print support apparatus that prints based on printing specification information including specifications for a printed material. The print support apparatus includes: a printing specification information acquiring unit that acquires the printing specification information; a printing apparatus information acquiring unit that acquires printing apparatus information indicating capabilities of a plurality of printing apparatuses; a printing apparatus selecting unit that selects a printing apparatus as a printing destination among the plurality of printing apparatuses based on the printing specification information acquired by the printing specification information acquiring unit and the printing apparatus information acquired by the printing apparatus information acquiring unit; a document data acquiring unit that acquires the/a document data associated with the printing specification information; a document data processing unit that processes the document data acquired by the document data acquiring unit based on printing apparatus information indicating a capability of the printing apparatus selected by the printing apparatus selecting unit and the printing specification information acquired by the printing specification information acquiring unit; a printing setting information creating unit that creates printing setting information including a printing setting of the printing apparatus selected by the printing apparatus selecting unit based on the printing specification information acquired by the printing specification information acquiring unit; and a printing requiring unit that requires printing of the printing apparatus selected by the printing apparatus selecting unit based on the printing setting information created by the printing setting information creating unit and the document data processed by the document data processing unit.

According to this aspect, the printing specification information is acquired by the printing specification information acquiring unit, and the printing apparatus information is acquired by the printing apparatus information acquiring unit. In addition, the printing apparatus selecting unit selects the printing apparatus as the printing destination among the plurality of printing apparatuses based on the acquired printing specification information and the printing apparatus information. Then, the document data acquiring unit acquires the document data associated with the printing specification information, and the document data processing unit processes the document data based on the printing apparatus information indicating the apparatus capability of the selected printing apparatus and the acquired printing specification information. In addition, the printing specification information creating unit creates the printing setting information including the printing setting of the selected printing apparatus based on the acquired printing specification information, and the printing requiring unit requires the printing of the selected printing apparatus based on the created printing specification information and the processed document data.

Thereby, even though no single printing apparatus is provided that can achieve the specifications for the printed material entirely, the printing apparatuses capable of partially achieving the specifications for the printed material are used, and the specifications for the printed material can be achieved.

In this case, the printing specification information refers to information which describes the specification of a desired printing material as a final result by the printing process. Specifically, the printing specification information includes information about finishing paper sizes, kinds of printing mediums, a folding method, a cutting method, a binding location, a binding method, the number of printed copies, a method of printing double sides, document data and pages to be printed, and used ink. In the printing specification information, only the specification of the final result may be described, and the printing setting information described below is not described. That is, the printing apparatus cannot be automatically operated by using only the printing specification information, and the printing specification information needs to be converted into the printing setting information that can satisfy the specification. Hereinafter, this is applicable to various types of print support programs, various types of storage mediums, various types of methods of supporting printing, various types of printing apparatus selecting apparatuses, various types of print support apparatuses, various types of printing apparatus selecting programs, a method of selecting a printing apparatus, a method of creating a printing apparatus determining tree, and various embodiments, which will be described in detail below.

Further, the printing setting information refers to detailed setting information of the printing apparatus used in the printing process. Specifically, the printing setting information includes information about paper sizes, an imposition method, detailed coordinate information in the imposition, a folding method, and a binding location, which are used in the imposition (performing printing by allocating a plurality of pages to one face of paper so as to become a finishing paper size through folding and cutting). The setting information included in the printing setting information may include information overlapping the printing specification information. Hereinafter, this is applicable to various types of print support programs, various types of storage mediums, various types of methods of supporting printing, various types of printing apparatuses selecting apparatus, various types of print support apparatuses, various types of printing apparatus selecting programs, a method of selecting a printing apparatus, a method of creating a printing apparatus determining tree, and various embodiments, which will be described in detail below.

Further, examples of the process of the document data may include rotating of pages of the document data (unit of 90°), enlargement or reduction of pages of the document data, forming one document data by combining a plurality of document data, creating imposed document data from the document data of the plurality of pages, extracting only specific pages of the document data, dividing a single paper of the document data into a plurality of pages, and changing the order of pages of the document data (for example, even-numbered page→odd-numbered page or changing the order of pages to become a reverse order). Hereinafter, this is applicable to various types of print support programs, various types of storage mediums, various types of methods of supporting printing, various types of print support apparatuses, and various embodiments, which will be described in detail below.

In addition, the structure of the printing specification information acquiring unit is not limited so long as it can acquire the printing specification information. For example, the printing specification information may be inputted through the input device, the printing specification information may be obtained or received from an external device, and the printing specification information may be read out from a storing device or a storage medium. Accordingly, the acquirement includes at least input, obtainment, reception, and reading. This is applicable to various types of printing apparatus information acquiring units and various types of document data acquiring units.

Further, the document data that is associated with the printing specification information refers to electronic document data that becomes the printing processing subject based on the printing specification. As an association method, the document data may be directly included in the printing specification information or only the location of the document data such as URL (Uniform Resource Locator) or a file path may be described in the printing specification information. Furthermore, the plurality of document data is associated with the printing specification information. In this case, not only all pages of the document data but also only a specific page may be associated. Hereinafter, this is applicable to various types of print support programs, various types of storage mediums, various types of methods of supporting printing, various types of print support apparatuses, and various embodiments, which will be described in detail below.

Preferably, the print support apparatus further includes: a printing apparatus determining tree storing unit that stores a printing apparatus determining tree by associating a plurality of the printing setting with one another in a tree and associating the printing apparatuses with terminal nodes of the plurality of printing settings. Further, the printing apparatus selecting unit traces the printing apparatus determining tree based on the specifications for the printed material included in the printing specification information, and selects a printing apparatus that is associated with a reached node or a neighboring node thereof.

In this case, the printing apparatus selecting unit traces the printing apparatus determining tree based on the specifications for the printed material included in the printing specification information, and the printing apparatus that is associated with the reached node or the neighboring node thereof is selected.

Thereby, even though no printing apparatus is provided that can achieve the specifications for the printed material, it is possible to select the printing apparatus that can achieve the specifications for the printed material.

In this case, the printing apparatus determining tree storing unit stores the printing apparatus determining tree by all the units at all the times. The printing apparatus determining tree storing unit may store the printing apparatus determining tree in advance, and the printing apparatus determining tree may be stored by the input from the external device at the time of the operation of the printing apparatus without storing the printing apparatus determining tree in advance.

Preferably, the printing setting information includes a printing control instruction that controls the printing required by the printing requiring unit.

Preferably, the print support apparatus further includes: a message display unit that displays a message in accordance with the printing control instruction included in the printing setting information; and a confirmation input unit that inputs the occurrence of confirmation of the message. Further, when the occurrence of the confirmation is inputted by the confirmation input unit, the printing requiring unit requires the printing apparatus to perform printing.

In this case, the message display unit displays the message in accordance with the printing control instruction included in the printing setting information. In this case, if the user inputs the occurrence of the confirmation with respect to the message through the input unit, the printing requiring unit requires the printing of the printing apparatus.

According to a second aspect of the invention, there is provided a print support program that prints based on printing specification information containing printing material. The program is used to allow a computer to execute the steps of: acquiring the printing specification information; acquiring printing apparatus information indicating capabilities of a plurality of printing apparatuses; selecting a printing apparatus as a printing destination among the plurality of printing apparatuses based on the printing specification information acquired by the acquiring of the printing specification information and the printing apparatus information acquired by the acquiring of the printing apparatus information; acquiring document data associated with the printing specification information; processing the document data acquired by the acquiring of the document data based on printing apparatus information indicating a capability of the printing apparatus selected by the selecting of the printing apparatus and the printing specification information acquired by the acquiring of the printing specification information; creating printing setting information including a printing setting of the printing apparatus selected by the selecting of the printing apparatus based on the printing specification information acquired by the acquiring of the printing specification information; and requiring printing of the printing apparatus selected by the selecting of the printing apparatus based on the printing setting information created by the creating of the printing setting information and the document data processed by the processing of the document data.

According to this aspect, the program is read out by the computer, and the computer executes the process in accordance with the read program. As a result, it is possible to achieve the same effects as the print support apparatus according to the first aspect of the invention.

Preferably, during the selecting of the printing apparatus, the print apparatus determining tree is traced which is by associating the plurality of printing settings with the tree shape and associating the plurality of printing apparatuses with the terminal nodes of the plurality of printing settings based on the specifications for the printed material included in the printing specification information, and the printing apparatus is selected which is associated with the reached node or the neighboring node thereof.

In this case, the program is read out by the computer, and the computer executes the process in accordance with the read program. As a result, it is possible to achieve the same effects as the print support apparatus according to the second aspect of the invention.

Preferably, the printing setting information includes the printing control instruction that controls the printing required in the requiring of the printing.

In this case, the program is read out by the computer, and the computer executes the process in accordance with the read program. As a result, it is possible to achieve the same effects as the print support apparatus according to the first aspect of the invention.

Preferably, the program is used to allow the computer to execute the steps of: displaying a message in accordance with the printing control instruction included in the printing setting information; and inputting the occurrence of the confirmation with respect to the message. Further, during the requiring of the printing, when the occurrence of the confirmation is inputted in the inputting of the confirmation, the printing is required with respect to the printing program.

In this case, the program is read out by the computer, and the computer executes the process in accordance with the read program. As a result, it is possible to achieve the same effects as the print support apparatus according to the first aspect of the invention.

According to a third aspect of the invention, there is provided a computer readable storage medium that stores a print support program that prints based on printing specification information including specifications for a printed material. The program is used to allow a computer to execute the steps of: acquiring the printing specification information; acquiring printing apparatus information indicating capabilities of a plurality of printing apparatuses; selecting a printing apparatus as a printing destination among the plurality of printing apparatuses based on the printing specification information acquired by the acquiring of the printing specification information and the printing apparatus information acquired by the acquiring of the printing apparatus information; acquiring document data associated with the printing specification information; processing the document data acquired by the acquiring of the document data based on printing apparatus information indicating a capability of the printing apparatus selected by the selecting of the printing apparatus and the printing specification information acquired by the acquiring of the printing specification information; creating printing setting information including a printing setting of the printing apparatus selected by the selecting of the printing apparatus based on the printing specification information acquired by the acquiring of the printing specification information; and requiring printing of the printing apparatus selected by the selecting of the printing apparatus based on the printing setting information created by the creating of the printing setting information and the document data processed by the processing of the document data.

According to this aspect, the program is read out from the storage medium by the computer, and the computer executes the process in accordance with the read program. As a result, it is possible to achieve the same effects as the print support apparatus according to the first aspect of the invention.

Preferably, during the selecting of the printing apparatus, the print apparatus determining tree is traced which is by associating the plurality of printing settings with the tree shape and associating the plurality of printing apparatuses with the terminal nodes of the plurality of printing settings based on the specifications for the printed material included in the printing specification information, and the printing apparatus is selected which is associated with the reached node or the neighboring node thereof.

In this case, the program is read out from the storage medium by the computer, and the computer executes the process in accordance with the read program. As a result, it is possible to achieve the same effects as the print support apparatus according to the first aspect of the invention.

Preferably, the printing setting information includes the printing control instruction that controls the printing required in the requiring of the printing.

In this case, the program is read out from the storage medium by the computer, and the computer executes the process in accordance with the read program. As a result, it is possible to achieve the same effects as the print support apparatus according to the first aspect of the invention.

Preferably, the program is used to allow the computer to execute the steps of: displaying a message in accordance with the printing control instruction included in the printing setting information; and inputting the occurrence of the confirmation with respect to the message. Further, during the requiring of the printing, when the occurrence of the confirmation is inputted in the inputting of the confirmation, the printing is required with respect to the printing program.

In this case, the program is read out from the storage medium by the computer, and the computer executes the process in accordance with the read program. As a result, it is possible to achieve the same effects as the print support apparatus according to the first aspect of the invention.

According to a fourth aspect of the invention, there is provided a method of supporting printing based on printing specification information including printing material. The method includes: acquiring the printing specification information; acquiring printing apparatus information indicating capabilities of a plurality of printing apparatuses; selecting a printing apparatus as a printing destination among the plurality of printing apparatuses based on the printing specification information acquired by the acquiring of the printing specification information and the printing apparatus information acquired by the acquiring of the printing apparatus information; acquiring document data associated with the printing specification information; processing the document data acquired by the acquiring of the document data based on printing apparatus information indicating a capability of the printing apparatus selected by the selecting of the printing apparatus and the printing specification information acquired by the acquiring of the printing specification information; creating printing setting information including a printing setting of the printing apparatus selected by the selecting of the printing apparatus based on the printing specification information acquired by the acquiring of the printing specification information; and requiring printing of the printing apparatus selected by the selecting of the printing apparatus based on the printing setting information created by the creating of the printing setting information and the document data processed by the processing of the document data.

Thereby, it is possible to achieve the same effects as the print support apparatus according to the first aspect of the invention.

According to a fifth aspect of the invention, there is provided a method of supporting printing based on printing specification information including printing material. The method includes: by means of an operation unit, acquiring the printing specification information; acquiring printing apparatus information indicating capabilities of a plurality of printing apparatuses; selecting a printing apparatus as a printing destination among the plurality of printing apparatuses based on the printing specification information acquired by the acquiring of the printing specification information and the printing apparatus information acquired by the acquiring of the printing apparatus information; acquiring document data associated with the printing specification information; processing the document data acquired by the acquiring of the document data based on printing apparatus information indicating a capability of the printing apparatus selected by the selecting of the printing apparatus and the printing specification information acquired by the acquiring of the printing specification information; creating printing setting information including a printing setting of the printing apparatus selected by the selecting of the printing apparatus based on the printing specification information acquired by the acquiring of the printing specification information; and requiring printing of the printing apparatus selected by the selecting of the printing apparatus based on the printing setting information created by the creating of the printing setting information and the document data processed by the processing of the document data.

Thereby, it is possible to achieve the same effects as the print support apparatus according to the first aspect of the invention.

Preferably, during the selecting of the printing apparatus, the print apparatus determining tree is traced which is by associating the plurality of printing settings with the tree shape and associating the plurality of printing apparatuses with the terminal nodes of the plurality of printing settings based on the specifications for the printed material included in the printing specification information, and the printing apparatus is selected which is associated with the reached node or the neighboring node thereof.

Thereby, it is possible to achieve the same effects as the print support apparatus according to the first aspect of the invention.

Preferably, the printing setting information includes the printing control instruction that controls the printing required in the requiring of the printing.

Thereby, it is possible to achieve the same effects as the print support apparatus according to the first aspect of the invention.

Preferably, the method of supporting printing further includes: displaying a message in accordance with the printing control instruction included in the printing setting information; and inputting the occurrence of the confirmation with respect to the message. Further, during the requiring of the printing, when the occurrence of the confirmation is inputted in the inputting of the confirmation, the printing is required with respect to the printing program.

Thereby, it is possible to achieve the same effects as the print support apparatus according to the first aspect of the invention.

According to a sixth aspect of the invention, there is provided a printing apparatus selecting apparatus that selects a printing apparatus as a printing destination among a plurality of printing apparatuses. The printing apparatus selecting apparatus includes: a printing history information storing unit that stores printing history information, the printing history information indicating a history of printing performed based on printing specification information including printing material and printing setting information including a printing setting of the printing apparatus, the printing history information including the specifications for the printed material and the printing setting; a printing specification information acquiring unit that acquires the printing specification information; a printing apparatus information acquiring unit that acquires printing apparatus information indicating capabilities of the plurality of printing apparatuses; a printing apparatus determining tree creating unit that creates a printing apparatus determining tree by associating a plurality of the printing setting with one another in a tree and associating the printing apparatuses with terminal nodes of the plurality of printing settings based on the printing history information stored by the printing history information storing unit and the printing apparatus information acquired by the printing apparatus information acquiring unit; and a printing apparatus selecting unit that selects the printing apparatus as the printing destination among the plurality of printing apparatuses based on the printing specification information acquired by the printing specification information acquiring unit and the printing apparatus determining tree created by the printing apparatus determining tree creating unit.

According to this aspect, the printing specification information acquiring unit acquires the printing specification information, and the printing apparatus information acquiring unit acquires the printing apparatus information. Then, the printing apparatus determining tree creating unit creates the printing apparatus determining tree based on the printing history information of the printing history information storing unit and the acquired printing apparatus information. Since the printing history information includes the specifications for the printed material and the printing setting, it is possible to determine the priority degree of the required printing setting by comparing the required specification of the printing material with the actually selected printing setting. Accordingly, the printing apparatus determining tree is created in accordance with the priority degree of the printing setting.

Further, the printing apparatus selecting unit selects the printing apparatus as the printing destination from the plurality of printing apparatuses based on the acquired printing specification information and the created printing apparatus determining tree.

Thereby, even though no printing apparatus is provided that can achieve the specifications for the printed material, it is possible to select the printing apparatus that is capable of the specifications for the printed material according to the priority degree of the required printing setting.

Preferably, the printing apparatus selecting apparatus further includes: a user identification information acquiring unit that acquires user identification information corresponding to the printing specification information; and a printing history information retrieving unit that retrieves the printing history information from the printing history information storing unit based on the user identification information acquired by the user identification information acquiring unit. Further, the printing history information includes user identification information for identifying users, and the printing apparatus determining tree creating unit creates the printing apparatus determining tree based on the printing history information retrieved by the printing history information retrieving unit and the printing apparatus information.

In this case, the user identification information acquiring unit acquires the user identification information corresponding to the printing specification information, and the printing history information retrieving unit retrieves the printing history information from the printing history information storing unit based on the acquired user identification information. Further, the printing apparatus determining tree creating unit creates the printing apparatus determining tree based on the retrieved printing history information and the printing apparatus information.

Thereby, it is possible to select the printing apparatus that can achieve the specifications for the printed material according to the priority degree of the printing setting required by each user.

Preferably, the print support apparatus further includes: a document attribute information acquiring unit that acquires document attribute information corresponding to the printing specification information; and a printing history information retrieving unit that retrieves the printing history information from the printing history information storing unit based on the document attribute information acquired by the document attribute information acquiring unit. Further, the printing history information includes the document attribute information indicating an attribute of the document data, and the printing apparatus determining tree creating unit creates the printing apparatus determining tree based on the printing history information retrieved by the printing history information retrieving unit and the printing apparatus information.

According to this aspect, the document attribute information acquiring unit acquires the document attribute information corresponding to the printing specification information, and the printing history information retrieving unit retrieves the printing history information from the printing history information storing unit based on the acquired document attribute information. Further, the printing determining tree creating unit creates the printing apparatus determining tree based on the retrieved printing history information and the printing apparatus information.

Thereby, it is possible to select the printing apparatus that can achieve the specifications for the printed material according to the priority degree of the printing setting required for each attribute of the document data.

Preferably, the printing apparatus selecting unit traces the printing apparatus determining tree based on the specifications for the printed material included in the printing specification information, and selects a printing apparatus that is associated with a reached node or a neighboring node thereof.

In this case, the printing apparatus selecting unit traces the printing apparatus determining tree based on the specifications for the printed material included in the printing specification information, and selects the printing apparatus that is associated with the reached node or the neighboring node thereof.

According to a seventh aspect of the invention, there is provided a print support apparatus that prints using a plurality of printing apparatuses. The print support apparatus includes: a printing history information storing unit that stores printing history information, the printing history information indicating a history of printing performed based on printing specification information including printing material and printing setting information including a printing setting of the printing apparatus, the printing history information including the specifications for the printed material and the printing setting; a printing specification information acquiring unit that acquires the printing specification information; a printing apparatus information acquiring unit that acquires printing apparatus information indicating capabilities of the plurality of printing apparatuses; a printing apparatus determining tree creating unit that creates a printing apparatus determining tree by associating a plurality of the printing setting with one another in a tree and associating the printing apparatuses with terminal nodes of the plurality of printing settings based on the printing history information stored by the printing history information storing unit and the printing apparatus information acquired by the printing apparatus information acquiring unit; and a printing apparatus selecting unit that selects the printing apparatus as the printing destination among the plurality of printing apparatuses based on the printing specification information acquired by the printing specification information acquiring unit and the printing apparatus determining tree created by the printing apparatus determining tree creating unit; a document data acquiring unit that acquires the/a document data associated with the printing specification information; a document data processing unit that processes the document data acquired by the document data acquiring unit based on printing apparatus information indicating a capability of the printing apparatus selected by the printing apparatus selecting unit and the printing specification information acquired by the printing specification information acquiring unit; a printing setting information creating unit that creates printing setting information including a printing setting of the printing apparatus selected by the printing apparatus selecting unit based on the printing specification information acquired by the printing specification information acquiring unit; and a printing requiring unit that requires printing of the printing apparatus selected by the printing apparatus selecting unit based on the printing setting information created by the printing setting information creating unit and the document data processed by the document data processing unit.

According to this aspect, the printing specification information acquiring unit acquires the printing specification information, and the printing apparatus information acquiring unit acquires the printing apparatus information. Then, the printing apparatus determining tree creating unit creates the printing apparatus determining tree based on the printing history information of the printing history information storing unit and the acquired printing apparatus information. Since the printing history information includes the specifications for the printed material and the printing setting, it is possible to determine the priority degree of the required printing setting by comparing the required specification of the printing material with the actually selected printing setting. Accordingly, the printing apparatus determining tree is created in accordance with the priority degree of the printing setting.

Further, the printing apparatus selecting unit selects the printing apparatus as the printing destination among the plurality of printing apparatuses based on the acquired printing specification information and the created printing apparatus determining tree.

Furthermore, the document data acquiring unit acquires the/a document data associated with the printing specification information, the document data processing unit processes the document data acquired by the document data acquiring unit based on printing apparatus information indicating a capability of the printing apparatus selected by the printing apparatus selecting unit and the printing specification information acquired by the printing specification information acquiring unit. In addition, the printing setting information creating unit creates printing setting information including a printing setting of the printing apparatus selected by the printing apparatus selecting unit based on the printing specification information acquired by the printing specification information acquiring unit, and the printing requiring unit requires printing of the printing apparatus selected by the printing apparatus selecting unit based on the printing setting information created by the printing setting information creating unit and the document data processed by the document data processing unit.

Thereby, in addition to the effect of the printing apparatus selecting apparatus according to the sixth aspect of the invention, even though no printing apparatus is provided that can achieve the specifications for the printed material, it is possible to select the printing apparatus that is capable of the specifications for the printed material according to the priority degree of the required printing setting.

According to an eighth aspect of the invention, there is provided a printing apparatus selecting program that selects a printing apparatus as a printing destination among a plurality of printing apparatuses. The program is used to allow a computer to execute the steps of: acquiring printing specification information including printing material; acquiring printing apparatus information indicating capabilities of the plurality of printing apparatuses; creating a printing apparatus determining tree by associating a plurality of printing settings with one another in a tree and associating the printing apparatuses with terminal nodes of the plurality of printing settings based on printing history information of a printing history information storing unit and the printing apparatus information acquired by the acquiring of the printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; and selecting the printing apparatus as the printing destination among the plurality of printing apparatuses based on the printing specification information acquired by the acquiring of the printing specification information and the printing apparatus determining tree created by the creating of the printing apparatus determining tree.

According to this aspect, the program is read out by the computer, and the computer executes the process in accordance with the read program. Thereby, it is possible to achieve the same effects as the printing apparatus selecting apparatus according to the sixth aspect of the invention.

Preferably, the program is used to allow the computer to execute the steps of: acquiring user identification information corresponding to the printing specification information, and retrieving the printing history information from the printing history information storing unit based on the user identification information acquired by the acquiring of the user identification information. Further, the printing history information includes the user identification information that identifies the user. During the creating of the printing apparatus determining tree, the printing apparatus determining tree is created based on the printing history information retrieved by the retrieving of the printing history information and the printing apparatus information.

In this case, the program is read out by the computer, and the computer executes the process in accordance with the read program. Thereby, it is possible to achieve the same effects as the sixth aspect of the invention.

Preferably, the program is used to allow the computer to execute the steps of: acquiring of the document attribute information corresponding to the printing specification information, and retrieving of the document history information acquired by the acquiring of the document attribute information from the printing history information storing unit based on the document attribute property acquired by the acquiring of the document attribute information. Further, during the creating of the printing apparatus determining tree, the printing apparatus determining tree is created based on the printing history information retrieved by the retrieving of the printing history information and the printing apparatus information.

In this case, the program is read out by the computer, and the computer executes the process in accordance with the read program. Thereby, it is possible to achieve the same effects as the printing apparatus selecting apparatus according to the sixth aspect of the invention.

Preferably, during the selecting of the printing apparatus, the printing apparatus determining tree is traced based on the specifications for the printed material included in the printing specification information, and the printing apparatus is selected which is associated with the reached node or the neighboring node.

In this case, the program is read out by the computer, and the computer executes the process in accordance with the read program. Thereby, it is possible to achieve the same effects as the printing apparatus selecting apparatus according to the sixth aspect of the invention.

According to a ninth aspect of the invention, there is provided a print support program that prints using a plurality of printing apparatuses. The program is used to allow a computer to execute the steps of: acquiring printing specification information including printing material; acquiring printing apparatus information indicating capabilities of the plurality of printing apparatuses; creating a printing apparatus determining tree by associating a plurality of printing settings with one another in a tree and associating the printing apparatuses with terminal nodes of the plurality of printing settings based on printing history information of a printing history information storing unit and the printing apparatus information acquired by the acquiring of the printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; selecting a printing apparatus as a printing destination among the plurality of printing apparatuses based on the printing specification information acquired by the acquiring of the printing specification information and the printing apparatus determining tree created by the creating of the printing apparatus determining tree; acquiring document data associated with the printing specification information; processing the document data acquired by the acquiring of the document data based on printing apparatus information indicating a capability of the printing apparatus selected by the selecting of the printing apparatus and the printing specification information acquired by the acquiring of the printing specification information; creating printing setting information including a printing setting of the printing apparatus selected by the selecting of the printing apparatus based on the printing specification information acquired by the acquiring of the printing specification information; and requiring printing of the printing apparatus selected by the selecting of the printing apparatus based on the printing setting information created by the creating of the printing setting information and the document data processed by the processing of the document data.

According to this aspect, the program is read out by the computer, and the computer executes the process in accordance with the read program. Thereby, it is possible to achieve the same effects as the print support apparatus.

According to a tenth aspect of the invention, there is provided a computer readable storage medium that stores a printing apparatus selecting program that selects a printing apparatus as a printing destination among a plurality of printing apparatuses. The program is used to allow a computer to execute the steps of: acquiring printing specification information including printing material; acquiring printing apparatus information indicating capabilities of the plurality of printing apparatuses; creating a printing apparatus determining tree by associating a plurality of printing settings with one another in a tree and associating the printing apparatuses with terminal nodes of the plurality of printing settings based on printing history information of a printing history information storing unit and the printing apparatus information acquired by the acquiring of the printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; and selecting a printing apparatus as a printing destination among the plurality of printing apparatuses based on the printing specification information acquired by the acquiring of the printing specification information and the printing apparatus determining tree created by the creating of the printing apparatus determining tree.

According to this aspect, the program is read out from the storage medium by the computer, and the computer executes the process in accordance with the read program. Thereby, it is possible to achieve the same effects as the printing apparatus selecting apparatus according to the sixth aspect of the invention.

Preferably, the program is used to allow the computer to execute the steps of: acquiring user identification information corresponding to the printing specification information, and retrieving the printing history information from the printing history information storing unit based on the user identification information acquired by the acquiring of the user identification information. Further, the printing history information includes the user identification information that identifies the user. During the creating of the printing apparatus determining tree, the printing apparatus determining tree is created based on the printing history information retrieved by the retrieving of the printing history information and the printing apparatus information.

In this case, the program is read out from the storage medium by the computer, and the computer executes the process in accordance with the read program. Thereby, it is possible to achieve the same effects as the sixth aspect of the invention.

Preferably, the program is used to allow the computer to execute the steps of: acquiring of the document attribute information corresponding to the printing specification information, and retrieving of the document history information acquired by the acquiring of the document attribute information from the printing history information storing unit based on the document attribute property acquired by the acquiring of the document attribute information. Further, during the creating of the printing apparatus determining tree, the printing apparatus determining tree is created based on the printing history information retrieved by the retrieving of the printing history information and the printing apparatus information.

In this case, the program is read out from the storage medium by the computer, and the computer executes the process in accordance with the read program. Thereby, it is possible to achieve the same effects as the printing apparatus selecting apparatus according to the sixth aspect of the invention.

Preferably, during the selecting of the printing apparatus, the printing apparatus determining tree is traced based on the specifications for the printed material included in the printing specification information, and the printing apparatus is selected which is associated with the reached node or the neighboring node thereof.

In this case, the program is read out from the storage medium by the computer, and the computer executes the process in accordance with the read program. Thereby, it is possible to achieve the same effects as the printing apparatus selecting apparatus according to the sixth aspect of the invention.

According to an eleventh aspect of the invention, there is provided a computer readable storage medium that stores a print support program that prints using a plurality of printing apparatuses. The program is used to allow a computer to execute the steps of: acquiring printing specification information including printing material; acquiring printing apparatus information indicating capabilities of the plurality of printing apparatuses; creating a printing apparatus determining tree by associating a plurality of printing settings with one another in a tree and associating the printing apparatuses with terminal nodes of the plurality of printing settings based on printing history information of a printing history information storing unit and the printing apparatus information acquired by the acquiring of the printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; selecting a printing apparatus as a printing destination among the plurality of printing apparatuses based on the printing specification information acquired by the acquiring of the printing specification information and the printing apparatus determining tree created by the creating of the printing apparatus determining tree; acquiring document data associated with the printing specification information; processing the document data acquired by the acquiring of the document data based on printing apparatus information indicating a capability of the printing apparatus selected by the selecting of the printing apparatus and the printing specification information acquired by the acquiring of the printing specification information; creating printing setting information including a printing setting of the printing apparatus selected by the selecting of the printing apparatus based on the printing specification information acquired by the acquiring of the printing specification information; and requiring printing of the printing apparatus selected by the selecting of the printing apparatus based on the printing setting information created by the creating of the printing setting information and the document data processed by the processing of the document data.

In this case, the program is read out from the storage medium by the computer, and the computer executes the process in accordance with the read program. Thereby, it is possible to achieve the same effects as the print support apparatus according to the seventh aspect of the invention.

According to a twelfth aspect of the invention, there is provided a method of selecting a printing apparatus as a printing destination among a plurality of printing apparatuses. The method includes: acquiring printing specification information including printing material; acquiring printing apparatus information indicating capabilities of the plurality of printing apparatuses; creating a printing apparatus determining tree by associating a plurality of printing settings with one another in a tree and associating the printing apparatuses with terminal nodes of the plurality of printing settings based on printing history information of a printing history information storing unit and the printing apparatus information acquired by the acquiring of the printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; and selecting the printing apparatus as the printing destination among the plurality of printing apparatuses based on the printing specification information acquired by the acquiring of the printing specification information and the printing apparatus determining tree created by the creating of the printing apparatus determining tree.

Thereby, it is possible to achieve the same effects as the printing apparatus selecting apparatus according to the sixth aspect of the invention.

According to a thirteenth aspect of the invention, there is provided a method of selecting a printing apparatus as a printing destination among a plurality of printing apparatuses. The method includes: by means of an operation unit, acquiring printing specification information including printing material; acquiring printing apparatus information indicating capabilities of the plurality of printing apparatuses; creating a printing apparatus determining tree by associating a plurality of printing settings with one another in a tree and associating the printing apparatuses with terminal nodes of the plurality of printing settings based on printing history information of a printing history information storing unit and the printing apparatus information acquired by the acquiring of the printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; and selecting the printing apparatus as the printing destination among the plurality of printing apparatuses based on the printing specification information acquired by the acquiring of the printing specification information and the printing apparatus determining tree created by the creating of the printing apparatus determining tree.

Thereby, it is possible to achieve the same effects as the printing apparatus selecting apparatus according to the sixth aspect of the invention.

Preferably, the method of selecting a printing apparatus further includes acquiring user identification information corresponding to the printing specification information, and retrieving the printing history information from the printing history information storing unit based on the user identification information acquired by the acquiring of the user identification information. Further, the printing history information includes the user identification information that identifies the user. During the creating of the printing apparatus determining tree, the printing apparatus determining tree is created based on the printing history information retrieved by the retrieving of the printing history information and the printing apparatus information.

Thereby, it is possible to achieve the same effects as the printing apparatus selecting apparatus according to the sixth aspect of the invention.

Preferably, the method of selecting a printing apparatus further includes: acquiring of the document attribute information corresponding to the printing specification information, and retrieving of the document history information acquired by the acquiring of the document attribute information from the printing history information storing unit based on the document attribute property acquired by the acquiring of the document attribute information. Further, the printing history information includes the document attribute information that indicates an attribute of the document data. During the creating of the printing apparatus determining tree, the printing apparatus determining tree is created based on the printing history information retrieved by the retrieving of the printing history information and the printing apparatus information.

Thereby, it is possible to achieve the same effects as the printing apparatus selecting apparatus according to the sixth aspect of the invention.

Preferably, during the selecting of the printing apparatus, the printing apparatus determining tree is traced based on the specifications for the printed material included in the printing specification information, and the printing apparatus is selected which is associated with the reached node or the neighboring node thereof.

Thereby, it is possible to achieve the same effects as the printing apparatus selecting apparatus according to the sixth aspect of the invention.

According to a fourteenth aspect of the invention, there is provided a method of supporting printing using a plurality of printing apparatuses. The method includes: acquiring printing specification information including printing material; acquiring printing apparatus information indicating capabilities of the plurality of printing apparatuses; creating a printing apparatus determining tree by associating a plurality of printing settings with one another in a tree and associating the printing apparatuses with terminal nodes of the plurality of printing settings based on printing history information of a printing history information storing unit and the printing apparatus information acquired by the acquiring of the printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; selecting a printing apparatus as a printing destination among the plurality of printing apparatuses based on the printing specification information acquired by the acquiring of the printing specification information and the printing apparatus determining tree created by the creating of the printing apparatus determining tree; acquiring document data associated with the printing specification information; processing the document data acquired by the acquiring of the document data based on printing apparatus information indicating a capability of the printing apparatus selected by the selecting of the printing apparatus and the printing specification information acquired by the acquiring of the printing specification information; creating printing setting information including a printing setting of the printing apparatus selected by the selecting of the printing apparatus based on the printing specification information acquired by the acquiring of the printing specification information; and requiring printing of the printing apparatus selected by the selecting of the printing apparatus based on the printing setting information created by the creating of the printing setting information and the document data processed by the processing of the document data.

Thereby, it is possible to achieve the same effects as the print support apparatus according to the sixth aspect of the invention.

According to a fifteenth aspect of the invention, there is provided a method of supporting printing using a plurality of printing apparatuses. The method includes: by means of an operation unit, acquiring printing specification information including printing material; acquiring printing apparatus information indicating capabilities of the plurality of printing apparatuses; creating a printing apparatus determining tree by associating a plurality of printing settings with one another in a tree and associating the printing apparatuses with terminal nodes of the plurality of printing settings based on printing history information of a printing history information storing unit and the printing apparatus information acquired by the acquiring of the printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; selecting a printing apparatus as a printing destination among the plurality of printing apparatuses based on the printing specification information acquired by the acquiring of the printing specification information and the printing apparatus determining tree created by the creating of the printing apparatus determining tree; acquiring document data associated with the printing specification information; processing the document data acquired by the acquiring of the document data based on printing apparatus information indicating a capability of the printing apparatus selected by the selecting of the printing apparatus and the printing specification information acquired by the acquiring of the printing specification information; creating printing setting information including a printing setting of the printing apparatus selected by the selecting of the printing apparatus based on the printing specification information acquired by the acquiring of the printing specification information; and requiring printing of the printing apparatus selected by the selecting of the printing apparatus based on the printing setting information created by the creating of the printing setting information and the document data processed by the processing of the document data.

Thereby, it is possible to achieve the same effects as the print support apparatus according to the sixth aspect of the invention.

According to a sixteenth aspect of the invention, there is provided a method of creating a printing apparatus determining tree. The method includes: creating a printing apparatus determining tree by associating a plurality of printing settings with one another in a tree and associating printing apparatuses with terminal nodes of the plurality of printing settings based on printing history information and printing apparatus information indicating capabilities of the plurality of printing apparatuses, the printing history information indicating a history of printing performed based on printing specification information including printing material and printing setting information including the printing setting of the printing apparatus, the printing history information including the specifications for the printed material and the printing setting.

Thereby, it is possible to achieve the same effects as the printing apparatus selecting apparatus according to the sixth aspect of the invention, when the printing apparatus determining tree is used in selecting the printing apparatus.

According to a seventeenth aspect of the invention, there is provided a method of creating a printing apparatus determining tree. The method includes: by means of an operation unit, creating a printing apparatus determining tree by associating a plurality of printing settings with one another in a tree and associating printing apparatuses with terminal nodes of the plurality of printing settings based on printing history information and printing apparatus information indicating capabilities of the plurality of printing apparatuses, the printing history information indicating a history of printing performed based on printing specification information including printing material and printing setting information including the printing setting of the printing apparatus, the printing history information including the specifications for the printed material and the printing setting.

Thereby, it is possible to achieve the same effects as the printing apparatus selecting apparatus according to the sixth aspect of the invention, when the printing apparatus determining tree is used in selecting the printing apparatus.

BRIEF DESCRIPTION OF THE DRAWINGS

The invention will be described with reference to the accompanying drawings, wherein like numbers reference like elements.

FIG. 3 is a diagram illustrating a data structure of a printing specification electronic job ticket.

FIG. 4 is a diagram illustrating a data structure of printing apparatus information.

FIG. 5 is a diagram illustrating a data structure of a printing setting electronic job ticket.

FIG. 6 is a diagram illustrating a data structure of a printing apparatus determining tree.

FIG. 9 is a diagram illustrating a data structure of a printing specification electronic job ticket.

FIG. 10 is a diagram illustrating a data structure of a printing setting electronic job ticket.

FIG. 11 is a diagram illustrating a dialog message screen.

FIG. 13 is a diagram illustrating a hardware structure of a host terminal 100a.

FIG. 14 is a diagram illustrating a data structure of a printing specification electronic job ticket.

FIG. 15 is a diagram illustrating a data structure of a printing setting electronic job ticket.

FIG. 16 is a diagram illustrating a data structure of document attribute information.

FIG. 17 is a diagram illustrating a data structure of a printing history information table.

FIG. 18 is a diagram illustrating a data structure of a printing apparatus information table.

FIG. 24 is a diagram illustrating a logical structure of a printing apparatus determining tree.

DESCRIPTION OF EXEMPLARY EMBODIMENTS

Hereinafter, a first embodiment of the invention will be described in detail with reference to the accompanying drawings. FIGS. 1 to 7 illustrate a print support apparatus, a print support program, and a method of supporting printing according to a first embodiment of the invention.

Figure 1:
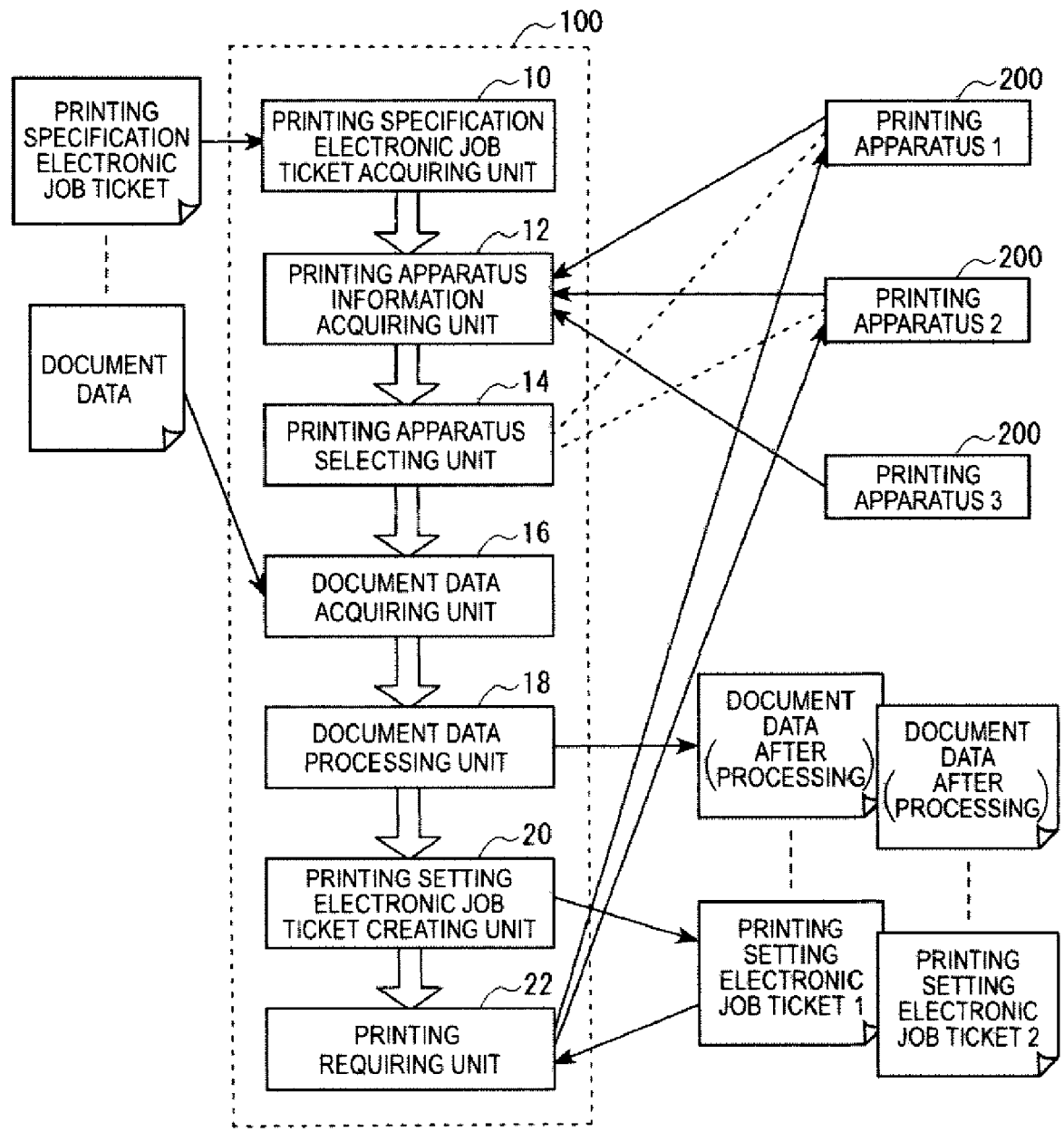
FIG. 1 is a block diagram schematically illustrating a function of a network system.

As shown in FIG. 1, the print support apparatus, the print support program, and the method of supporting printing according to the first embodiment of the invention are applied to a case in which a printing job is performed by a printing apparatus 200 while using a printing specification electronic job ticket.

First, a function of a network system according to this embodiment will be schematically described.

FIG. 1 is a block diagram schematically illustrating a function of a network system.

As shown in FIG. 1, a network 199 is connected to a host terminal 100 and a plurality of printing apparatuses 200.

The host terminal 100 includes a printing specification electronic job ticket acquiring unit 10 that acquires a printing specification electronic job ticket including specifications for a printed material, a printing apparatus information acquiring unit 12 that acquires printing apparatus information indicating capabilities of a plurality of printing apparatuses 200, and a printing apparatus selecting unit 14 that selects a printing apparatus 200 as a printing destination among the plurality of printing apparatuses 200 based on the printing specification electronic job ticket acquired by the printing specification electronic job ticket acquiring unit 10 and printing apparatus information acquired by the printing apparatus information acquiring unit 12.

The host terminal 100 further includes a document data acquiring unit 16 that acquires the/a document data associated with a printing specification electronic job ticket, and a document data processing unit 18 that processes document data acquired by the document data acquiring unit 16 based on the printing apparatus information indicating the apparatus capability of the printing apparatus 200 selected by the printing apparatus selecting unit 14 and the printing specification electronic job ticket acquired by the printing specification electronic job ticket acquiring unit 10.

The host terminal 100 further includes a printing setting electronic job ticket creating unit 20 that creates a printing setting electronic job ticket including a printing setting of the printing apparatus 200 selected by the printing apparatus selecting unit 14 based on the printing specification electronic job ticket acquired by the printing specification electronic job ticket acquiring unit 10, and a printing requiring unit 22 that requires printing of the printing apparatus 200 selected by the printing apparatus selecting unit 14 based on the printing setting electronic job ticket created by the printing setting electronic job ticket creating unit 20 and the document data processed by the document data processing unit 18.

Next, a structure of the host terminal 100 will be described in detail.

Figure 2:
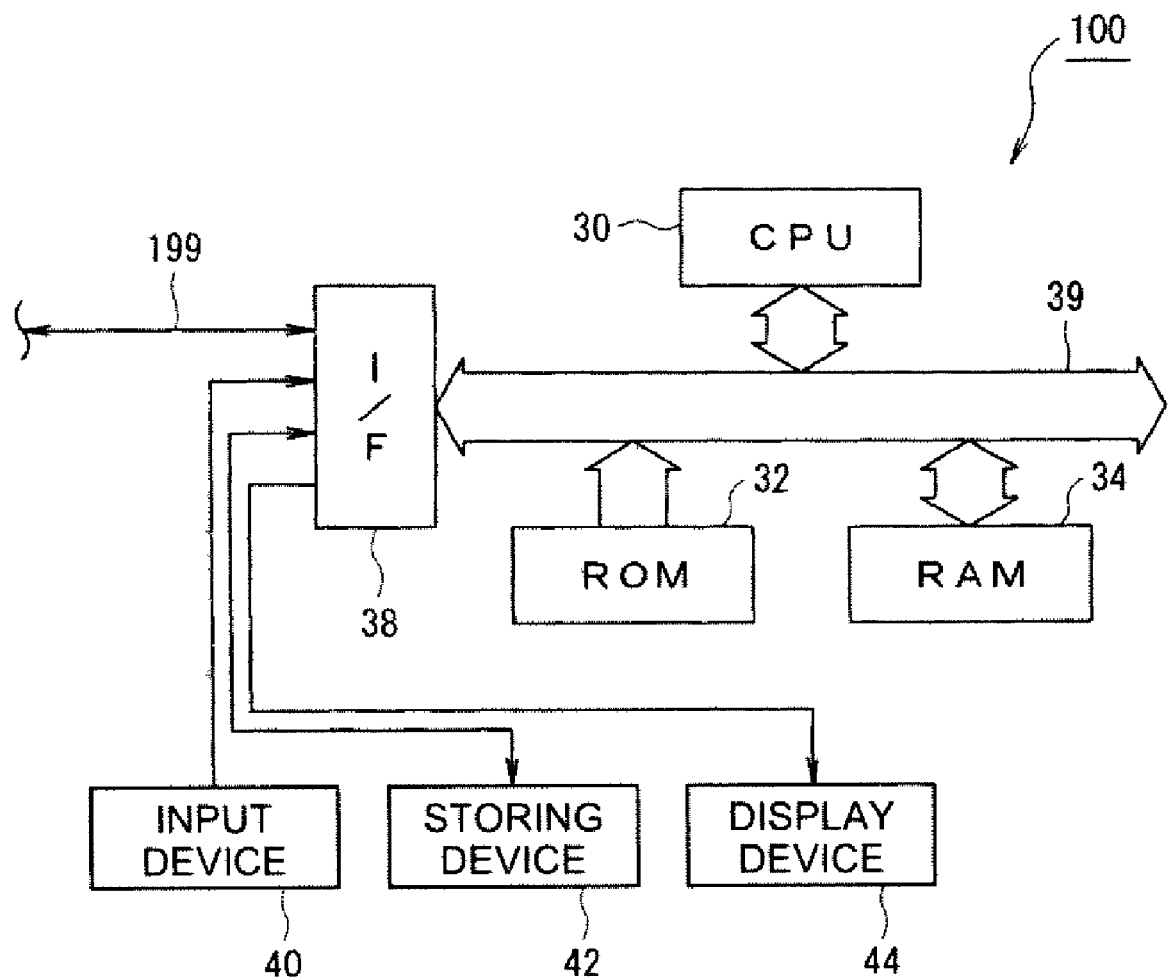
FIG. 2 is a diagram illustrating a hardware structure of a host terminal 100.

FIG. 2 is a diagram illustrating a hardware structure of the host terminal 100.

As shown in FIG. 2, the host terminal 100 includes a CPU 30 that controls an operation and an entire system based on a control program, a ROM 32 whose predetermined region stores the control program of the CPU 30 or the like in advance, a RAM 34 that stores data read from the ROM 32 or an operation result necessary for an operation process of the CPU 30, and an I/F 38 through which data is inputted or outputted to or from an external device, which are connected to one another through buses 39 in such a manner that data is transmitted or received among them. In this case, the buses 39 correspond to signal lines for transmitting data.

The IF 38 is connected to external devices. Specifically, IF 38 is connected to an input device 40, such as a keyboard or a mouse, which serves as a human interface and through which data can be inputted, a storing device 42 that stores data or a table as a file, a display device 44 that displays a screen based on an image signal, and signal lines through which various device are connected to the network 199.

Next, a data structure of the printing specification electronic job ticket will be described.

FIG. 3 is a diagram illustrating a data structure of the printing specification electronic job ticket.

The printing specification electronic job ticket corresponds to electronic data in which specifications of printed materials, such as paper sizes, the number of copies, paper kinds, or the like, are described. As shown in FIG. 3, in the printing specification electronic job ticket, tag sets of start tags and end tags are telescopically described between a predetermined start tag (for example, <entire specification>) and an end tag (for example, </entire specification>), and thus a printing format is set. For example, it can be described by a markup language such as, for example, XML (eXtensible Markup Language).

The printing specification electronic job ticket does not include detailed setting of the printing apparatus 200 for executing printing, and information of the printing apparatus 200. In addition, document data is designated in the printing specification electronic job ticket. In this case, a plurality of document data can be designated, or only a specific page of the document data can be designated.

Next, a data structure of the printing apparatus information will be described.

FIG. 4 is a diagram illustrating a data structure of the printing apparatus information.

As shown in FIG. 4, the printing apparatus information corresponds to electronic data in which a capability of the printing apparatus 200 is described. In FIG. 4, contents of paper sizes, paper kinds, existence and nonexistence of double-sided printing, printing quality, printing speed, existence or nonexistence of color printing, and existence or nonexistence of a stapler are described.

Next, a data structure of the printing setting electronic job ticket will be described.

FIG. 5 is a diagram illustrating a data structure of the printing setting electronic job ticket.

The printing setting electronic job ticket corresponds to electronic data in which detailed printing setting of the printing apparatus 200 is described so as to control the printing apparatus 200 for performing printing. As shown in FIG. 5, in the printing specification electronic job ticket, tag sets of start tags and end tags are telescopically described between a predetermined start tag (for example, <entire specification>) and an end tag (for example, </entire specification>), and thus a printing format is set. For example, it can be described by a markup language such as, for example, XML.

In the printing setting electronic job ticket, contents of the printing specification electronic job ticket may be used as they are, but initial information of the printing apparatus 200 may be primarily included. For example, the printing setting electronic job ticket includes collate setting, setting of a paper feeding tray, setting of a paper discharge tray, a saving mode or the like. The printing setting electronic job ticket is created based on the printing specification electronic job ticket, and the created printing setting electronic job ticket is inputted to the printing apparatus 200. As a result, the printing apparatus 200 can be controlled.

Next, a data structure of the storing apparatus 42 will be described.

In the storing apparatus 42, a printing apparatus determining tree for determining the printing apparatus 200 becoming a printing destination is stored.

FIG. 6 is a diagram illustrating a data structure of the printing apparatus determining tree.

As shown in FIG. 6, the printing apparatus determining trees are by associating the plurality of printing settings with one another in a tree and the printing apparatuses 200 with the terminal nodes of the plurality of printing settings. The printing apparatus determining trees can be created based on the printing apparatus information of the respective printing apparatuses 200.

In FIG. 6, according to the printing setting, the priority order is assigned in the order of paper sizes, paper kinds, existence or nonexistence of color printing, existence or nonexistence of double-side printing, and printing quality, and trees are constructed according to the priority order. Each of the printing apparatuses 200 is associated with a terminal node of the printing setting which can process. For example, in the printing apparatus determining tree, the printing apparatus 200 (only single-side printing can be performed) that corresponds to the printing setting in which a paper size is 'A4', a paper kind is 'glossy paper', double-side printing is not possible forms paths in the order of 'A4', 'glossy paper', and 'double-side printing No' from the most significant node, and associated with the terminal node of the printing setting. Accordingly, after the printing specification electronic job ticket is analyzed, when as necessary printing setting, the paper size 'A4', a paper kind 'glossy paper', and 'non-double-side printing No' (single-side printing) are set, the paths are traced in the same sequence, and the reached printing apparatus 200 may be selected.

Next, the process executed by the CPU 30 will be described.

Figure 7:
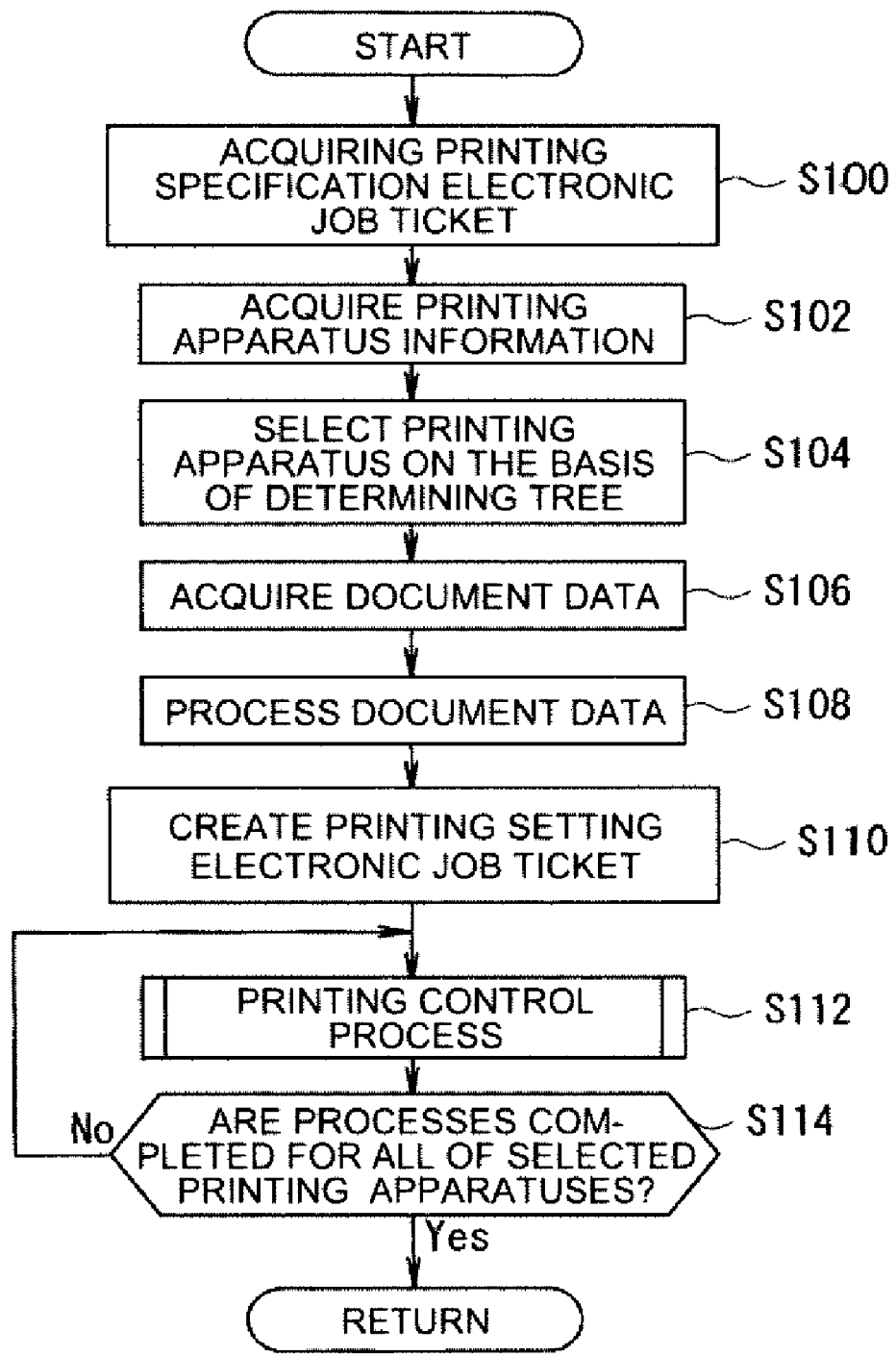
FIG. 7 is a flowchart illustrating a printing requiring process.

The CPU 30 is composed of a micro processing unit, drives a predetermined program stored in a predetermined region of the ROM 32, and executes a printing requiring process illustrated in a flowchart of FIG. 7 in accordance with the corresponding program.

FIG. 7 is a flowchart illustrating a printing requiring process.

The printing requiring process corresponds to a process requiring the printing of the printing apparatus 200. If the printing requiring process is executed by the CPU 30, first, the process proceeds to Step S100, as shown in FIG. 7.

In Step S100, the printing specification electronic job ticket is acquired. The printing specification electronic job ticket may be acquired through the network 199, and may be acquired by reading it from an external storage medium, such as a flash memory. Hereinafter, in Step S106, the same processes are performed.

Next, the process proceeds to Step S102, and printing apparatus information for the plurality of printing apparatuses 200 are acquired. For example, the printing apparatus information may be acquired by referring to the printer driver, or may be acquired by reading electronic files having been described printing capabilities for all printing apparatuses 200 that are connected in advance.

Next, the process proceeds to Step S104, and the printing apparatus determining tree is traced based on the specifications for the printed material included in the acquired printing specification electronic job ticket, the printing apparatus 200 associated with the reached node or the neighboring node thereof is selected, and the process proceeds to Step S106.

In Step S106, the document data designated by the printing specification electronic job ticket is acquired, the process proceeds to Step S108, the acquired document data is processed based on the printing apparatus information indicating the apparatus capability of the selected printing apparatus 200 and the acquired printing specification electronic job ticket, and the process proceeds to Step S110.

In Step S110, the printing setting electronic job ticket including the printing setting of the selected printing apparatus 200 is created based on the acquired printing specification electronic job ticket, the process proceeds to Step S112, the printing control process that requires the printing of the selected printing apparatus 200 is executed based on the created printing setting electronic job ticket and the processed document data, and the process proceeds to Step S114.

In Step S114, it is determined whether the process of Step S112 is completed with respect to all of the selected printing apparatuses 200, and when it is determined that the process is completed for all of the selected printing apparatuses 200 (Yes), a series of processes are completed, and the process returns to the original process.

In the meantime, in Step S114, when it is determined that the process is not completed with respect to all of the selected printing apparatuses 200 (No), the process proceeds to Step S112.

Next, the operation of this embodiment will be described.

The network 199 is connected to the three printing apparatuses 200. In the below description, these printing apparatuses 200 are represented as the printing apparatuses 1, 2, and 3.

In the host terminal 100, the printing specification electronic job ticket is acquired through Step S100. As a result, as shown in FIG. 3, the printing specification electronic job ticket is acquired. In the printing specification electronic job ticket of FIG. 3, the cover as glossy paper is designated by color, and the text as common paper is designated by monochrome. The text data becoming the printing subject is constructed as the same data file as the electronic file 1, and the first page of the electronic file 1 is designated by the cover and the next pages including a second page are designated by the text. As the paper size, all of the cover and the text are designated by an A4 size.

In addition, the printing apparatus information for the printing apparatuses 1 to 3 is acquired through Step S102. As a result, as shown in FIG. 6, the printing apparatus information is acquired.

Next, the printing apparatus 200 is selected through Step S104. In this embodiment, in the printing specification electronic job ticket, since the specifications are different from each other in the cover and the text, the printing apparatuses 200 for the respective printing specifications are selected.

A method of selecting the printing apparatus 200 according to the printing specification of the cover will now be described.

First, the paper size of the cover will be determined. As a result, since the paper size is the A4, as shown in FIG. 6, in the printing apparatus determining tree, an arrow labeled by 'A4' is traced. Then, the paper kind of the cover is determined. As a result, since the paper kind is glossy paper, an arrow labeled by 'glossy paper' is traced. Then, it is determined whether double-side printing is performed with respect to the cover. As a result, since single-side printing is preferably performed for the cover, an arrow labeled by 'double-side printing No' is traced. In this way, the printing apparatus determining tree is traced, and it is possible to select the printing apparatus 1 as the printing apparatus 200 that is capable of achieving the printing specification of the cover.

Then, a method of selecting the printing apparatus 200 according to the printing specification of the text will be described.

In the same manner, in the printing apparatus determining tree, the paper size traces A4, the paper kind traces the common paper, and existence or nonexistence of the color printing traces monochrome. In this case, it is possible to select the printing apparatus 2 as the printing apparatus 200 that is capable of achieving the printing specification of the text.

Then, the document data designated by the printing specification electronic job ticket is acquired through Step S106. Since the location of the document data is described in a formation of URL in the printing specification electronic job ticket, the document data is acquired from the described location.

Then, the document data is processed through Step S108. In this embodiment, since the printing specifications are differentiated in the cover and the text, the division of the text data is made according to the differentiated printing specifications. Specifically, as for the document data for a cover, the first page of the electronic file 1 is extracted and set as an electronic file 1', and as for the document data for the text, next pages including the second page of the electronic file 1 are set as an electronic file 1".

Then, the printing setting electronic job tickets including the printing setting of the selected printing apparatuses 1 and 2 are created through Step S110. As shown in FIG. 5, the printing setting electronic job tickets are respectively created for the cover and the text. In the printing setting electronic job ticket, the used printing apparatus 200 is described.

Then, with respect to the selected printing apparatuses 1 and 2, the printing setting described in the printing setting electronic job ticket is automatically performed through Step S112, and the printing control instruction of the document data that is described in the printing setting electronic job ticket is issued. As a result, the printed materials suitable for the printing specifications can be obtained from the printing apparatuses 1 and 2.

In this way, in this embodiment, the printing specification electronic job ticket is acquired, the printing apparatus information indicating the capabilities for the plurality of printing apparatuses 200 is acquired, the printing apparatus 200 becoming the printing destination is selected among the plurality of printing apparatuses 200 based on the acquired printing specification electronic jot ticket and printing apparatus information, the document data is processed based on the printing apparatus information indicating the apparatus capability of the selected printing apparatus 200 and the acquired printing specification electronic job ticket, the printing setting electronic job ticket including the printing setting of the selected printing apparatus 200 is created based on the acquired printing specification electronic job ticket, and the printing of the selected printing apparatus 200 is required based on the created printing setting electronic job ticket and the process document data.

Thereby, even though no printing apparatus 200 is provided that is capable of achieving the specifications for the printed material by one printing apparatus, the specifications for the printed material can be achieved by using the printing apparatuses 200 that can partially achieve the specifications for the printed material.

Further, in this embodiment, the printing apparatus determining tree is traced based on the printing specification included in the printing specification electronic job ticket, and the printing apparatus 200 that is associated with the reached node or the neighboring (e.g., adjacent) node thereof is selected.

Thereby, even though no printing apparatus 200 is provided that can achieve the specifications for the printed material, it is possible to select the printing apparatus 200 that is capable of achieving the specifications for the printed material based on the created printing setting electronic job ticket and the process document data.

In the first embodiment, the storing device 42 corresponds to the printing apparatus determining tree storing unit, the printing specification electronic job ticket acquiring unit 10 and Step S100 correspond to the printing specification information acquiring unit, and Step S100 corresponds to the printing specification information acquiring Step. Further, the printing apparatus information acquiring unit 12 and Step S102 correspond to the printing apparatus information acquiring unit, and Step S102 correspond to the printing apparatus information acquiring unit, and the printing apparatus selecting unit 14 and Step S104 correspond to the printing apparatus selecting unit.

Further, in the first embodiment, Step S104 corresponds to the printing apparatus selecting unit, the document data acquiring unit 16 and Step S106 correspond to the document data acquiring unit, and Step S106 corresponds to the document data acquiring unit. Further, the document data processing unit 18 and Step S108 correspond to the document data processing unit, Step S108 corresponds to the document data processing unit, and the printing setting electronic job ticket creating unit 20 and Step S110 correspond to the printing setting information creating unit.

In the first embodiment, Step S110 corresponds to the printing setting information creating unit, the printing requiring unit 22 and Step S112 correspond to the printing requiring unit, and Step S112 corresponds to the printing requiring unit. Further, the printing specification electronic job ticket corresponds to the printing specification information, the printing setting electronic job ticket corresponds to the printing setting information, and the CPU 30 corresponds to the operation unit.

Next, a second embodiment of the invention will be described in detail with reference to the accompanying drawings. FIGS. 8 to 11 illustrate a print support apparatus, a print support program, and a method of supporting printing according to a second embodiment of the invention.

The print support apparatus, the print support program, and the method of supporting printing according to the second embodiment of the invention are applied to a case in which a printing job is performed by a printing apparatus 200 while using a printing specification electronic job ticket. The second embodiment is different from the first embodiment in that the process of the printing setting electronic job ticket is exclusively controlled when double-side printing is performed by using the printing apparatus 200 capable of performing only single-side printing.

First, the printing control process of Step S112 will be described in detail.

Figure 8:
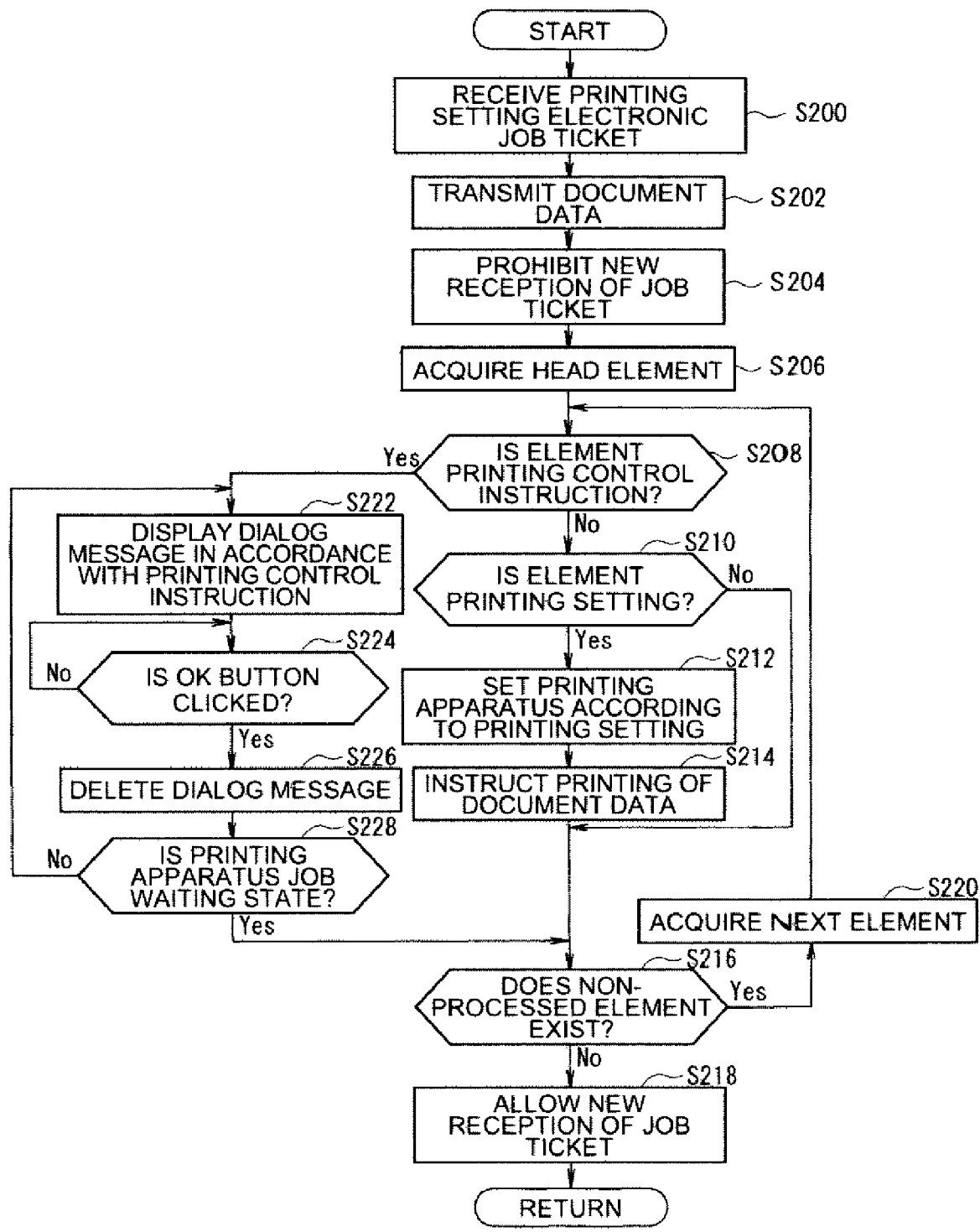
FIG. 8 is a flowchart illustrating a printing control process.

FIG. 8 is a flowchart illustrating the printing control process.

If the printing control process is executed in Step S112, first, the process proceeds to Step S200, as shown in FIG. 8.

In Step S200, the printing setting electronic job ticket is received, the process proceeds to Step S202, the document data is transmitted to the printing apparatus 200, the process proceeds to Step S204, the new reception of the printing setting electronic job ticket is prohibited, and the process proceeds to Step S206.

In Step S206, the head element is acquired from the received printing setting electronic job ticket, the process proceeds to Step S208, and it is determined whether the acquired element is the printing control instruction. In this case, when it is determined that the acquired element is not the printing control instruction (No), the process proceeds to Step S210.

In Step S210, it is determined whether the acquired element is the printing setting, and if it is determined that the acquired element is the printing setting (Yes), the process proceeds to Step S212. The printing apparatus 200 is set in accordance with the acquired printing setting, the process proceeds to Step S214, the printing of the document data is instructed with respect to the printing apparatus 200, and the process proceeds to Step S216.

In Step S216, it is determined whether the non-processed element exists in the printing setting electronic job ticket, and when it is determined that the non-processed element does not exist (No), the process proceeds to Step S218. Then, the new reception of the printing setting electronic jot ticket is allowed, a series of processes are completed, and the process returns to the original process.

In the meantime, in Step S216, when it is determined that the non-processed element exists in the printing setting electronic job ticket (Yes), the process proceeds to Step S220, a next element is acquired from the printing setting electronic job ticket, and the process proceeds to Step S208.

In the meantime, in Step S210, when it is determined that the acquired element is not the printing setting (No), the process proceeds to Step S216.

Further, in Step S208, when it is determined that the acquired element is the printing control instruction (Yes), the process proceeds to Step S222, a dialog message is displayed in accordance with the acquired printing control instruction, and the process proceeds to Step S224.

In Step S224, it is determined whether an OK button disposed on the dialog message screen is clicked. In this case, when it is determined that the OK button is clicked (Yes), the process proceeds to Step S226, but when it is determined that the OK button is not clicked (No), the process enters a waiting state in Step S224 until the OK button is clicked.

In Step S226, the dialog message is deleted, the process proceeds to Step S228, and it is determined whether the printing apparatus 200 is in a job waiting state. In this case, when it is determined that the printing apparatus 200 is in the job waiting state (Yes), the process proceeds to Step S216.

In the meantime, in Step S228, when it is determined that the printing apparatus 200 is not in the job waiting state (No), the process proceeds to Step S222.

Next, the operation of the second embodiment will be described.

FIG. 9 is a diagram illustrating a data structure of the printing specification electronic job ticket.

A case will be described in which the printing specification electronic job ticket shown in FIG. 9 is inputted. The connected printing apparatus 200 is the same as that of the first embodiment. Similar to the first embodiment, in the printing apparatus determining tree, in a case in which the paper size traces A4, the paper kind traces glossy paper, and the printing traces double-side printing, it results in 'not applicable'. As a result, the corresponding printing apparatus 200 does not exist, and the proper printing apparatus 200 cannot be selected. In this case, in the printing apparatus determining tree, the most neighboring printing apparatus 200 is selected. In this embodiment, the printing apparatus 1 where only the single-side printing can be performed is selected.

In this case, there occurs discordance in that double-side printing is designated in the printing specification, but the selected printing apparatus 200 cannot perform double-side printing. As such, when the printing specification of double-side printing is accepted in the printing apparatus 200 where only single-side printing can be performed, if the document data is divided into the surface document data of the page to be printed on the surface and the rear surface document data of a page to be printed on the rear surface, first, the surface document data is printed, and the discharged paper is manually fed again. Then, the rear surface document data is printed, and thus double-side printing can be simply performed.

FIG. 10 is a diagram illustrating a data structure of the printing setting electronic job ticket.

FIG. 11 is a diagram illustrating a dialog message screen.

Accordingly, the document data is divided into document data of only the odd-numbered pages (surface document data) and document data of only the even-numbered pages (rear surface document data). As shown in FIG. 10, the printing setting electronic job ticket for a surface and the printing setting electronic job ticket for a rear surface are respectively created. Further, after the surface document data is printed, the printing control instruction for displaying the dialog message shown in FIG. 11 is also created.

If the printing setting electronic job ticket for a surface is inputted, when the printing process for a surface is completed, the message dialog is outputted in accordance with the printing control instruction. When it is determined that the user clicks the OK button, the printing process for a rear surface is executed in accordance with the printing setting electronic job ticket for a rear surface. In this case, the determination whether the printing process for a surface is completed may be made by referring to the state of the printing apparatus 200 regularly, and the printing apparatus 200 may have a function of outputting the completion notification to the host terminal 100.

In the second embodiment, Steps S212 and S214 correspond to the printing requiring unit or the printing requiring step, and Step S222 corresponds to the message display unit or the message display step. In addition, Step S224 corresponds to the confirmation input unit or the confirmation input step, and the printing setting electronic job ticket corresponds to the printing setting information.

Next, a third embodiment of the invention will be described in detail with reference to the accompanying drawings. FIGS. 12 to 22 illustrate a print support apparatus, a printing apparatus selecting apparatus, a printing support program, a printing apparatus selecting program, a storage medium, a method of selecting a printing apparatus, a method of supporting printing, and a method of creating a printing apparatus determining tree according to a third embodiment of the invention.

Figure 12:
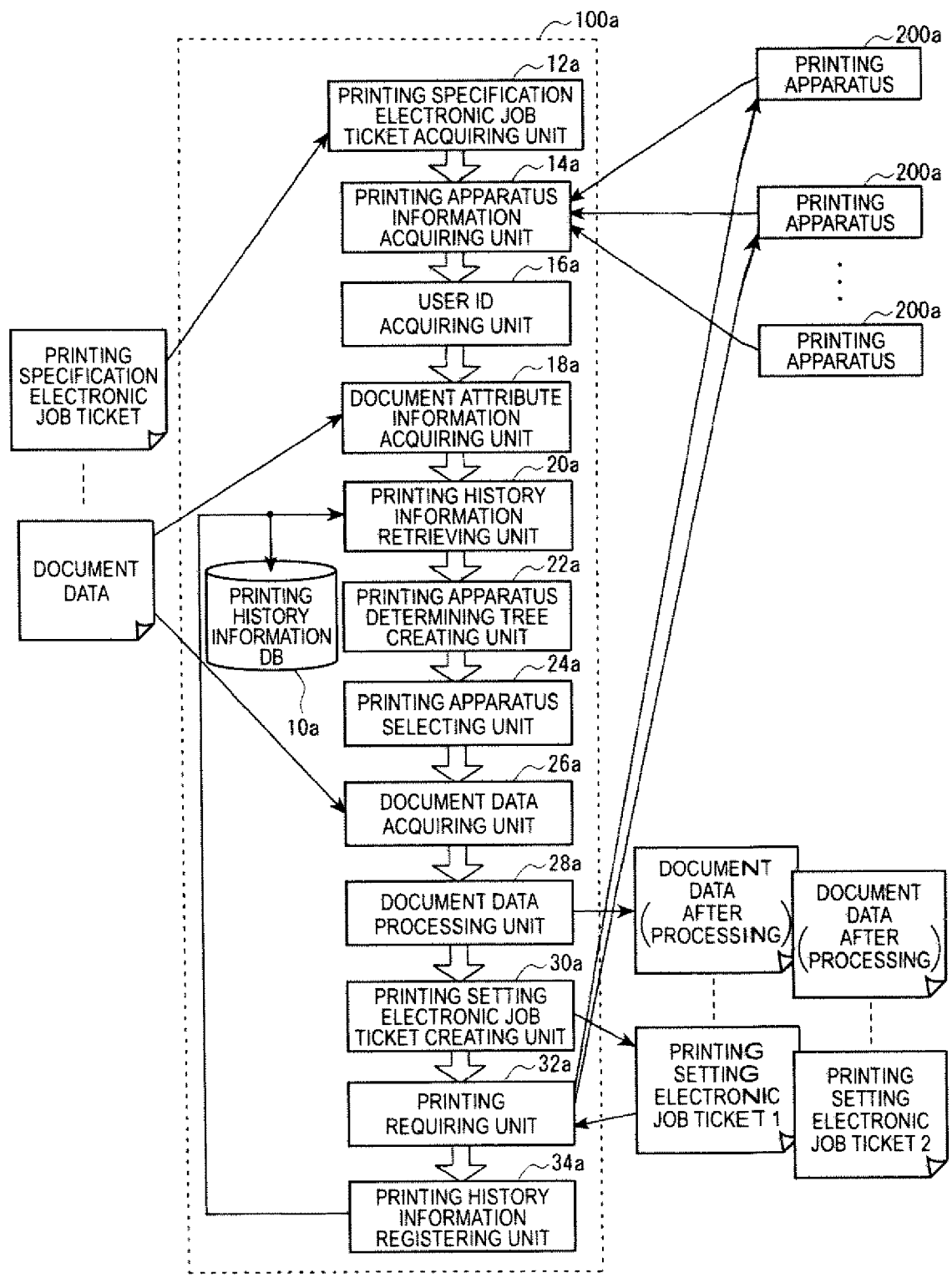
FIG. 12 is a block diagram schematically illustrating a function of a network system.

As shown in FIG. 12, the print support apparatus, a printing apparatus selecting apparatus, a printing support program, a printing apparatus selecting program, a storage medium, a method of selecting a printing apparatus, a method of supporting printing, and a method of creating a printing apparatus determining tree according to the third embodiment of the invention are applied to a case in which printing is performed by a printing apparatus 200a while using a printing specification electronic job ticket.

First, a function of a network system according to this embodiment is schematically described.

FIG. 12 is a block diagram schematically illustrating a function of a network system.

As shown in FIG. 12, a network 199a is connected to a host terminal 100a and a plurality of printing apparatuses 200a.

The host terminal 100a includes a printing history information database 10a (hereinafter, simply referred to as DB) that stores printing history information indicating a history of the printing that is performed based on a printing specification electronic job ticket including printed material and the printing setting electronic job ticket including the printing setting of the printing apparatus 200a. The printing history information includes printed material included in the printing specification electronic job ticket, the printing setting included in the printing setting electronic job ticket, a user ID of the user having required the printing, and an attribute of the document data becoming the printing subject.

The host terminal 100a further includes a printing specification electronic job ticket acquiring unit 12a that acquires a printing specification electronic job ticket, a printing apparatus information acquiring unit 14a that acquires the printing apparatus information indicating the capabilities for the plurality of printing apparatuses 200a, a user ID acquiring unit 16a that acquires a user ID of the user requiring the printing, and a document attribute information acquiring unit 18a that acquires document attribute information indicating an attribute of the document data associated with the printing specification electronic job ticket.

The host terminal 100a further includes a printing history information retrieving unit 20a that retrieves the corresponding printing history information from the printing history information DB 10a based on the user ID acquired by the user ID acquiring unit 16a and the document attribute information acquired by the document attribute information acquiring unit 18a, and a printing apparatus determining tree creating unit 22a that creates the printing apparatus determining tree based on the printing history information retrieved by the printing history information retrieving unit 20a and the printing apparatus information acquired by the printing apparatus information acquiring unit 14a.

The host terminal 100a further includes a printing apparatus selecting unit 24a that selects the printing apparatus 200a becoming the printing destination among the plurality of printing apparatuses 200a based on the printing specification electronic job ticket acquired by the printing specification electronic job ticket acquiring unit 12a and the printing apparatus determining tree created by the printing apparatus determining tree creating unit 22a, and a document data acquiring unit 26a that acquires the document data associated with the printing specification electronic job ticket.

The host terminal 100a further includes a document data processing unit 28a that processes the document data acquired by the document data acquiring unit 26a on the basis the printing apparatus information indicating the apparatus capability of the printing apparatus 200a selected by the printing apparatus selecting unit 24a and the printing specification electronic job ticket, and a printing setting electronic job ticket creating unit 30a that creates a printing setting electronic job ticket including the printing setting of the printing apparatus 200a selected by the printing apparatus selecting unit 24a based on the printing specification electronic job ticket.

The host terminal 100a further includes a printing requiring unit 32a that requires printing of the printing apparatus 200a selected by the printing apparatus selecting unit 24a based on the printing setting electronic job ticket created by the printing setting electronic job ticket creating unit 30a and the document data processed by the document data processing unit 28a, and a printing history information registering unit 34a that registers the printing history information to the printing history information DB 10a based on the printing specification electronic job ticket, the printing setting electronic job ticket, the user ID and the document attribute information.

Next, a structure of the host terminal 100a will be described in detail.

FIG. 13 is a diagram illustrating a hardware structure of the host terminal 100a.

As shown in FIG. 13, the host terminal 100a includes a CPU 50a that controls an operation and an entire system based on a control program, a ROM 52a whose predetermined region stores the control program of the CPU 50a or the like in advance, a RAM 54a that stores data read from the ROM 52a or an operation result necessary for an operation process of the CPU 50a, and an I/F 58a through which data is inputted or outputted to or from an external device, which are connected to one another through buses 59a in such a manner that data is transmitted or received among them. In this case, the buses 59a correspond to signal lines for transmitting data.

The I/F 58a is connected to external devices. Specifically, the I/F 58a is connected to an input device 60a, such as a keyboard or a mouse, which serves as a human interface and to which data can be inputted, a storing device 62a that stores data or a table as a file, a display device 64a that displays a screen based on an image signal, and signal lines through which various devices are connected to the network 199a.

Next, a data structure of the printing specification electronic job ticket will be described.

FIG. 14 is a diagram illustrating a data structure of the printing specification electronic job ticket.

The printing specification electronic job ticket corresponds to electronic data in which specifications of printed materials are described. As shown in FIG. 14, in the printing specification electronic job ticket, a specification ticket ID for discriminating a printing specification electronic job ticket, finishing paper sizes, existence or nonexistence of color printing, paper kinds, existence or nonexistence of double-side printing, printing speed, printing quality, a printed material binding method, and a printed material binding location are set. For example, the printing specification electronic job ticket can be described by a markup language such as, for example, XML. In this case, tag sets of a start tag and an end tag are telescopically described between a predetermined start tag (for example, <entire specification>) and an end tag </entire specification>), and thus the specifications for the printed material is set.

The printing specification electronic job ticket does not include detailed setting of the printing apparatus 200a for executing printing, and information of the printing apparatus 200a. In addition, document data is set in the printing specification electronic job ticket. In this case, a plurality of document data can be set or only a specific page of the document data can be set.

Next, a data structure of the printing setting electronic job ticket will be described.

FIG. 15 is a diagram illustrating a data structure of the printing setting electronic job ticket.

The printing setting electronic job ticket corresponds to electronic data where the printing setting of the printing apparatus 200a is described. As shown in FIG. 15, in the printing setting electronic job ticket, a setting ticket ID for discriminating a printing setting electronic job ticket, identifiers of the printing apparatuses 200a, feeding paper sizes, existence or nonexistence of color printing, paper kinds, existence or nonexistence of double-side printing, printing speed, resolution, kinds of paper folding functions, kinds of paper binding functions, or the like are set. Similar to the printing specification electronic job ticket, similar to the printing setting electronic job ticket, it can be described by a markup language such as, for example, XML.

In the printing setting electronic job ticket, contents of the printing specification electronic job ticket may be used as they are, but initial setting information of the printing apparatus 200a may be mainly included. For example, the initial setting information includes collate setting, setting of a paper feeding tray, setting of a paper discharge tray, a saving mode or the like. The printing setting electronic job ticket is created based on the printing specification electronic job ticket, and the created printing setting electronic job ticket is inputted to the printing apparatus 200a. As a result, the printing apparatus 200a can be controlled.

Next, a data structure of the document attribute information will be described.

FIG. 16 is a diagram illustrating a data structure of the document attribute information.

The document attribute information corresponds to electronic data where the attribute of the document data is described. As shown in FIG. 16, in the document attribute information, an attribute ID for discriminating the attribute of the document data, a purpose of a document, a minimum character size, and existence or nonexistence of a photo image are set. The document attribute information can also be described by a markup language such as, for example, XML, similar to the printing specification electronic job ticket.

Next, a data structure of the storing device 62a will be described.

In the storing device 62a, a printing history information table having been registered printing history information is stored.

FIG. 17 is a diagram illustrating a data structure of the printing history information table.

As shown in FIG. 17, in the printing history information table, one record is registered for each printing. Each record includes fields in which a date and time when the printing is performed, a user ID, an attribute ID, a specification ticket ID, a setting ticket ID, and specification completeness indicating whether the specifications for the printed material can be completely achieved are registered.

In FIG. 17, in the first stage of a record, '2005-06-01-08: 30', 'a user A', 'Attribute 01', 'JobIntent01', 'JobProces01', and 'Y' are registered. The record indicates a message that the printing is performed by the user A at 8:30, Jun. $1^{st}$, 2005, and the specifications for the printed material can be completely achieved. In addition, by referring to each ID, when the printing is performed, the attribute of the document data, the specifications for the printed material, and the printing setting can be specified.

In the storing device 62a, a printing device information table having registered the printing device information is also stored.

FIG. 18 is a diagram illustrating a data structure of the printing apparatus information table.

As shown in FIG. 18, in the printing apparatus information table, one record is registered for each printing apparatus 200a. Each record includes fields in which existence or nonexistence of the color printing, applicable paper kinds, applicable paper sizes, existence or nonexistence of double-side printing, printing quality, and printing speed are registered. The printing speed is defined as page per minute (ppm).

Next, a process that is executed by the CPU 50a will be described.

Figure 19:
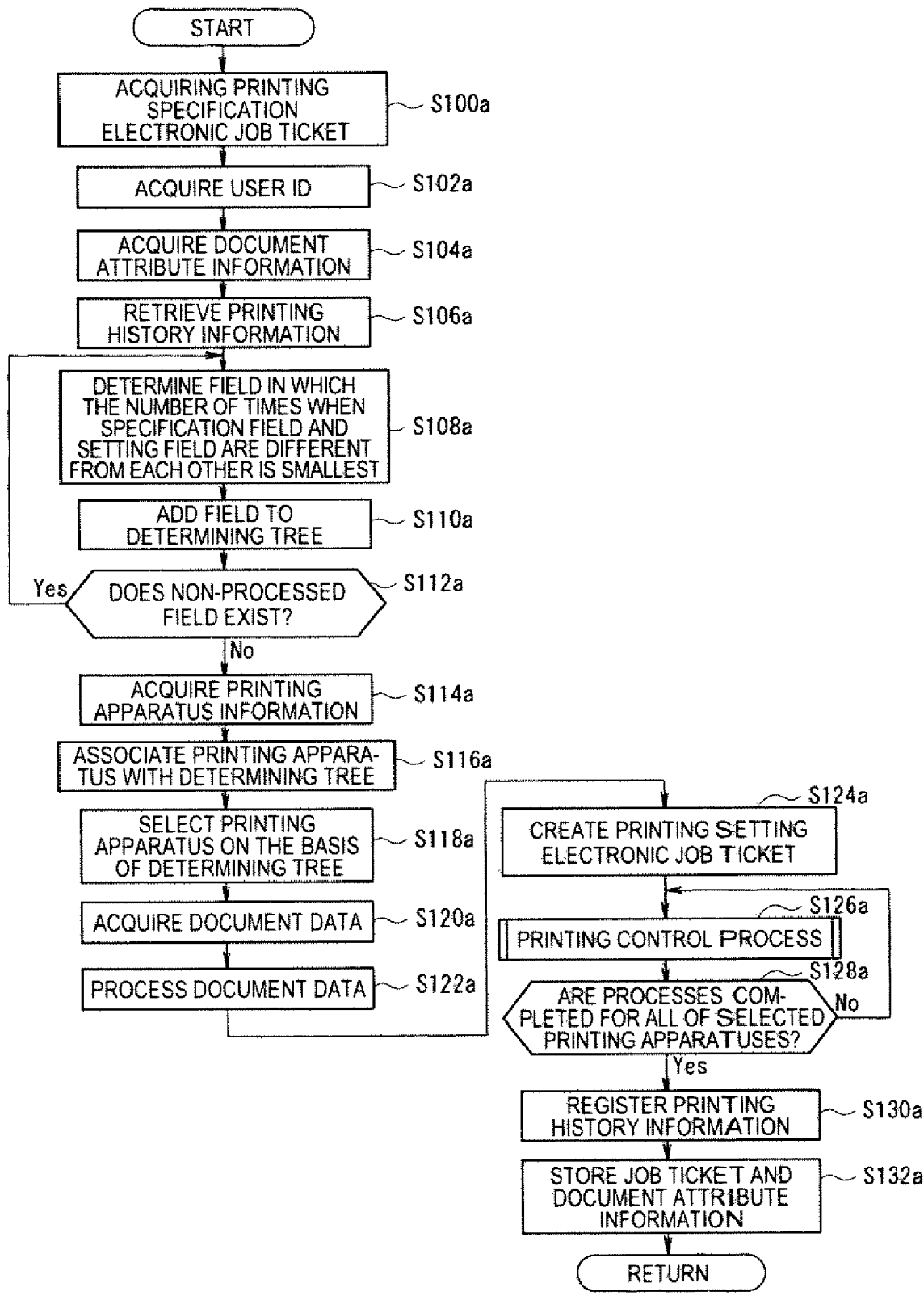
FIG. 19 is a flowchart illustrating a printing requiring process.

The CPU 50a is composed of a micro processing unit, drives a predetermined program stored in a predetermined region of the ROM 52a and executes a printing requiring process illustrated in a flowchart of FIG. 19 in accordance with the corresponding program.

FIG. 19 is a flowchart illustrating a printing requiring process.

The printing requiring process corresponds to a process requiring the printing of the printing apparatus 200a. If the printing requiring process is executed by the CPU 50a, first, the process proceeds to Step S100a, as shown in FIG. 19.

In Step S100a, the printing specification electronic job ticket is acquired. The printing specification electronic job ticket may be acquired through the network 199a, and may be acquired by reading it from an external storage medium, such as a flash memory. Hereinafter, in Steps S104a and S114a, the same processes are performed.

Next, the process proceeds to Step S102a, a user ID of the user requiring the printing is required, the process proceeds to Step S104a, the document attribute information indicating the attribute of the document data associated with the printing specification electronic job ticket is acquired, and the process proceeds to Step S106a.

In Step S106a, based on the acquired user ID and the document attribute information, all of the printing history information which includes the same user ID and the attribute ID and has specification completeness designated as 'N' are retrieved from the printing history information table, and the process proceeds to Step S108a.

In Step S108a, among fields of the specifications for the printed material and the printing setting, one field which is not processed and can be compared (for example, 'paper size') is selected, and the number of times when the specifications for the printed material specified by the retrieved printing history information and an the contents of the printed material for the selected field are not equal to each other is calculated. The specifications for the printed material and the contents of the printing setting are specified in the following method. That is, the specification ticket ID and the setting ticket ID are acquired from the printing history information, the printing specification electronic job ticket and the printing setting electronic job ticket corresponding to the acquired specification ticket ID and the setting ticket ID are read from the storing device 62a, and the specifications for the printed material and the printing setting are acquired from the read printing specification electronic job ticket and the printing setting electronic job ticket. As a result, the specifications for the printed material and the contents of the printing setting are specified. These processes are performed for all fields that are not processed and can be compared, and the field that the number of times of the discordance is smallest is determined. For example, in the past printing, when only the printing apparatus 200a corresponding to A3 and monochrome and the printing apparatus 200a corresponding to A4 and color exist, the printing specification electronic job ticket including the specification of A3 and color has been applied to the past printing. Since this case corresponds to a case in which the request of the user is not satisfied, the user is inquired about what to do. At this time, in a case in which the user selects the printing apparatus 200a corresponding to A3 and the monochrome, it is considered that the user abandons the color printing. In this case, it can be determined that the color printing has the lower priority order than the paper size. In the meantime, when the user selects the printing apparatus 200a corresponding to A4 and color, it is considered that the user abandons the paper size. In this case, it can be determined that the paper size has the lower priority order than the color printing. Accordingly, the field that the number of times of the discordance is smallest by comparing the specifications for the printed material and the printing setting based on the printing history information can be determined as the field having the higher priority by the user or the attribute of the document data.

Then, the process proceeds to Step S110a, and the determined field is added to the printing apparatus determining tree, and the process proceeds to Step S112a. In Step S112a, it is determined whether the non-processed field exists among the fields of the specifications for the printed material and the printing setting. In this case, when it is determined that the non-processed field does not exist (No), the process proceeds to Step S114a.

In Step S114a, the printing apparatus information is acquired for the plurality of printing apparatuses 200a. For example, the printing apparatus information may be acquired by referring to the printing driver, or may be acquired by reading electronic files having been described printing capabilities for all the printing apparatuses 200a that are connected in advance.

Then, the process proceeds to Step S116a. Based on the acquired printing apparatus information, the paths of the printing apparatus determining tree are formed, and the printing apparatus determining tree is created by associating the printing apparatus 200a with the terminal node, and the process proceeds to Step S118a. In Step S118a, the printing apparatus determining tree is traced based on the specifications for the printed material included in the acquired printing specification electronic job ticket, the printing apparatus 200a associated with the reached node or the neighboring node thereof is selected, and the process proceeds to Step S120a.

In Step S120a, the document data set by the printing specification electronic job ticket is acquired, the process proceeds to Step S122a, the acquired document data is processed based on the printing apparatus information indicating the apparatus capability of the printing apparatus 200a (hereinafter, simply referred to as selected printing apparatus 200a) selected in Step S118a and the acquired printing specification electronic job ticket, and the process proceeds to Step S124a.

In Step S124a, the printing setting electronic job ticket including the printing setting of the selected printing apparatus 200a is created based on the acquired printing specification electronic job ticket, the process proceeds to Step S126a, the printing control process that requires the printing of the selected printing apparatus 200a is executed based on the created printing setting electronic job ticket and the processed document data, and the process proceeds to Step S128a.

In Step S128a, it is determined whether the process of Step S126a is completed with respect to all of the selected printing apparatuses 200a, and when it is determined that the process is completed for all of the selected printing apparatuses 200a (Yes), and the process proceeds to Step S130a.

In Step S130a, the printing history information is registered in the printing history information table based on the acquired printing specification electronic job ticket, the user ID, the document attribute information, and the created printing setting electronic jot ticket, and the process proceeds to Step S132a. In Step S132a, the acquired printing specification electronic job ticket and document attribute information, and the created printing setting electronic job ticket are stored in the storing device 62a. Then, a series of processes are completed, and the process returns to the original process.

In Step S128a, when it is determined that the processes for all of the selected printing apparatuses 200a are not completed (No), the process proceeds to Step S126a.

In Step S112a, when it is determined that the non-processed field exists (Yes), the process proceeds to Step S108a.

Next, the operation of this embodiment will be described.

In the host terminal 100a, through Steps S100a to S116a, the printing specification electronic job ticket is acquired, the printing apparatus information indicating the capabilities for the plurality of printing apparatuses 200a are acquired, and the printing apparatus determining tree is created based on the printing history information of the printing history information table and the acquired printing apparatus information.

The printing apparatus determining tree is created according to the contents of the printing history information. Hereinafter, the difference will be described with respect to three examples.

EXAMPLE 1

Figure 20:
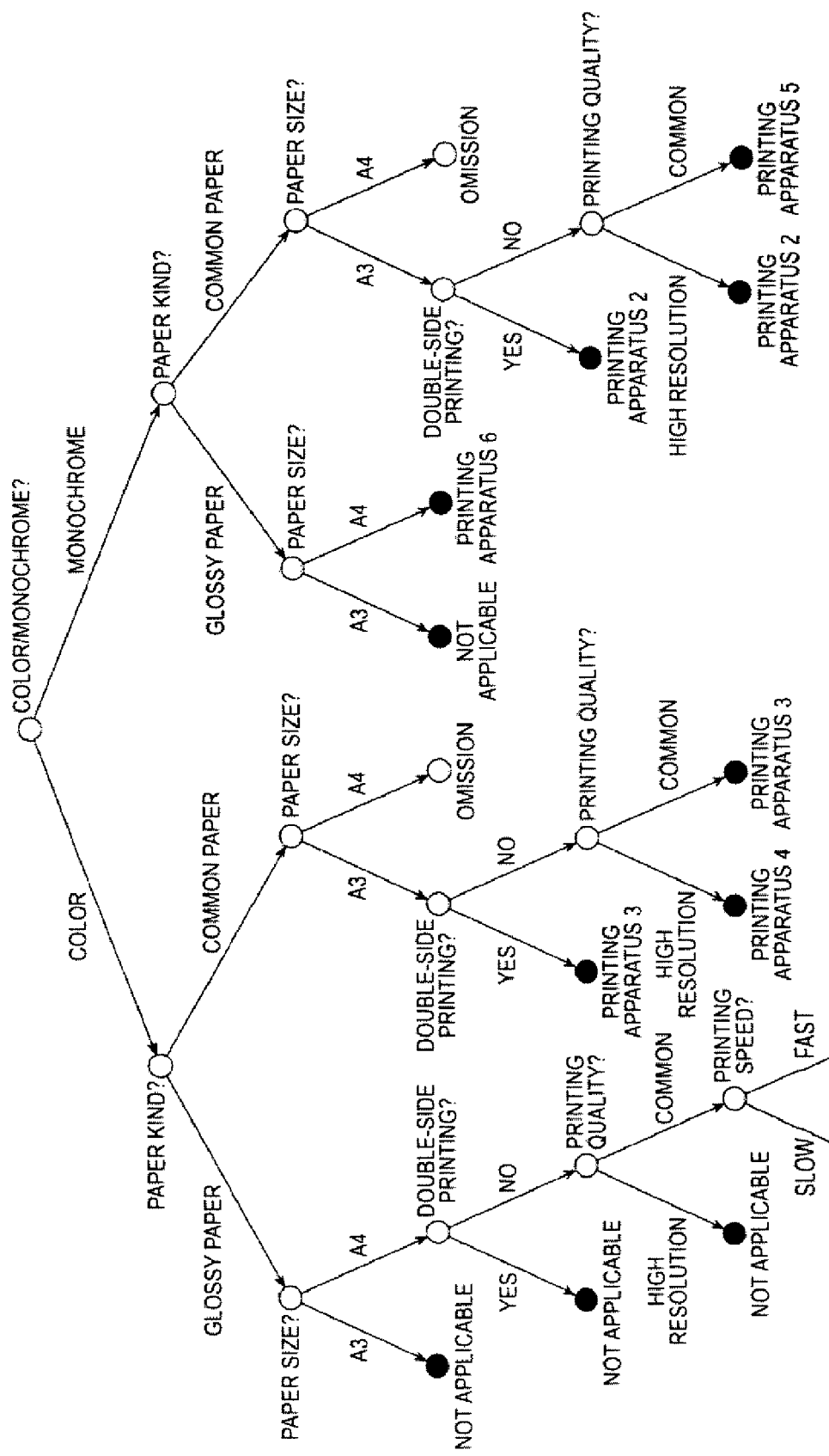
FIG. 20 is a diagram illustrating a logical structure of a printing apparatus determining tree that is created in a first example.

FIG. 20 is a diagram illustrating a logical structure of a printing apparatus determining tree created in a case of the example 1.

When the specifications for the printed material cannot be achieved as a result of investigation of the printing history information, statistics for which fields are changed among the fields of the specifications for the printed material so as to perform the printing process are calculated. As a result, if the fields are arranged in descending order of the number of changes, the result is as follows.

1. printing speed
2. printing quality
3. double-side printing
4. finishing paper size
5. paper kind
6. color/monochrome A field having a larger number of changes is determined to have a lower priority, and it is disposed on a lower layer level of the printing apparatus determining tree. Thereby, the printing apparatus determining tree is created, as shown in FIG. 20.

EXAMPLE 2

Figure 21:
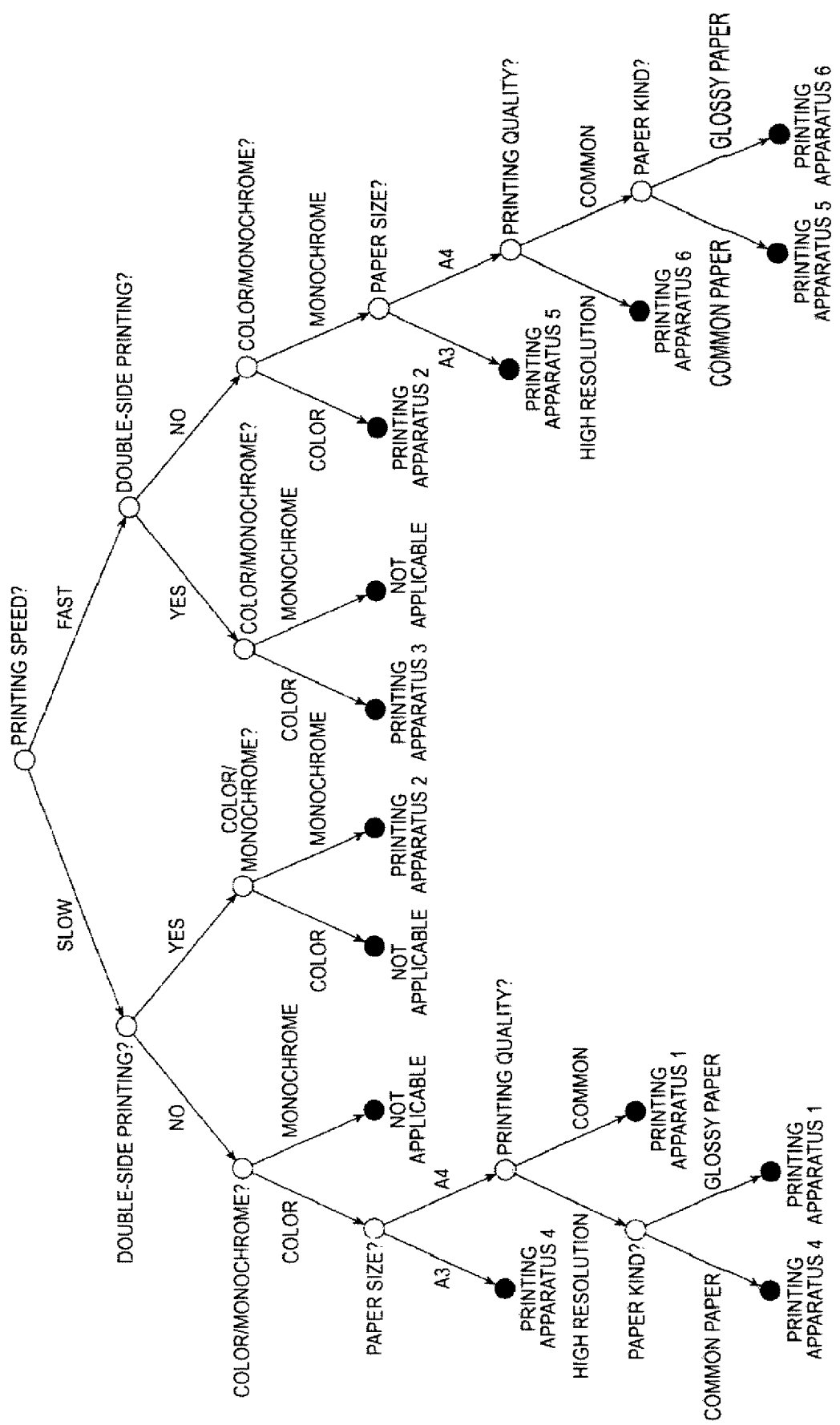
FIG. 21 is a diagram illustrating a logical structure of a printing apparatus determining tree that is created in a second example.

FIG. 21 is a diagram illustrating a logical structure of a printing apparatus determining tree created in a case of the example 2.

When the specifications for the printed material cannot be achieved as a result of investigation of the printing history information of the user A who inputs the printing specification electronic job ticket, the user A calculates statistics for which fields are changed among the fields of the specifications for the printed material so as to perform the printing process. As a result, if the fields are arranged in descending order of the number of changes, the result is as follows.

1. paper kind
2. printing quality
3. finishing paper size
4. color/monochrome
5. double-side printing
6. printing speed A field having a larger number of changes is determined to have a low priority, and it is disposed on a low layer level of the printing apparatus determining tree. Thereby, the printing apparatus determining tree is created, as shown in FIG. 21.

If the example 1 is compared with the example 2, it can be understood that the user A regards the printing speed as the most important field, and virtually ignores the paper kind. At this time, if the printing apparatus determining tree is created based on the priority order of the example 1, it does not lead to the result which the user A wants. Accordingly, for the user A, the printing apparatus determining tree is created in accordance with the specification set by the user A, and it is possible to select the printing apparatus that is capable of achieving the printing process according to setting of the user A.

EXAMPLE 3

Figure 22:
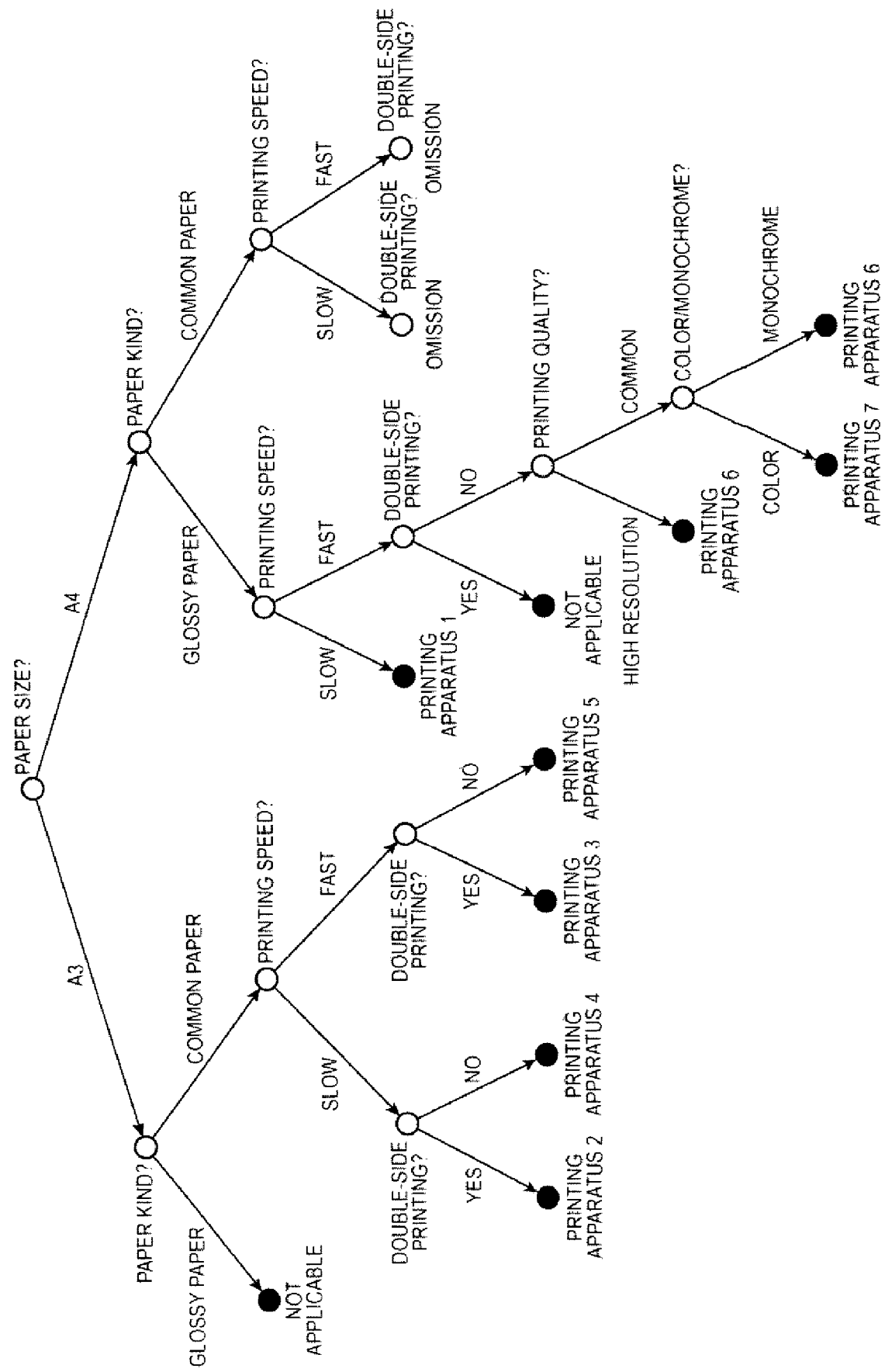
FIG. 22 is a diagram illustrating a logical structure of a printing apparatus determining tree that is created in a third example.

FIG. 22 is a diagram illustrating a logical structure of a printing apparatus determining tree created in a case of the example 3.

As a result of the investigation of the document data of the printing subject (or a result of requiring the meta data added to the document data), the attributes of the document data are as follows.
1. A minimum character size of the text is 10 pt.
2. A format template of document data corresponds to a procedure template in a company. Accordingly, as a result of investigating the printing history information equal or similar to the attribute from the printing history information table, when the specifications for the printed material cannot be achieved, statistics are calculated regarding which fields are changed among the fields of the specifications for the printed material so as to perform the printing process. *** As a result, if the fields are arranged in descending order of the number of changes, the result is as follows.
1. color/monochrome
2. printing quality
3. double-side printing
4. printing speed
5. paper kind
6. finishing paper size Since the document data is document data of the procedure in a company, the color printing is not necessarily performed. In addition, since double-side printing does not need to be performed, it is assumed that the fields are arranged as described above. A field having a larger number of changes is determined that it has low priority, and it is disposed on a low layer level of the printing apparatus determining tree. Thereby, the printing apparatus determining tree is created, as shown in FIG. 22.

As such, since the priority order of the fields varies according to the printed document data, the optimal printing apparatus determining tree can be created in accordance to the attribute of the document data.

Then, if the printing apparatus determining tree is created, through Steps S118a and S120a, the printing apparatus 200a is selected based on the printing specification electronic job ticket and the printing apparatus determining tree, the document data set by the printing specification electronic job ticket is acquired. In the printing specification electronic job ticket, since the location of the document data is described in a format of URL or the like, the document data is acquired from the described location.

Then, through Step S122a, the document data is processed. In this embodiment, the specification is set for each of the cover and the text, and the division of the text data is performed according to the set specifications. Specifically, as for the document data for a cover, the first page of the electronic file 1 is extracted and set as an electronic file 1', and as for the document data for the text, next pages including the second page of the electronic file 1 are set to an electronic file 1".

Then, the printing setting electronic job tickets including the printing setting of the selected printing apparatuses 200a are respectively created through Step S124a.

In addition, through Step S126a, the printing setting described in the printing setting electronic job ticket with respect to the selected printing apparatus 200a is automatically performed, and the printing control instruction of the document data described in the printing setting electronic job ticket is issued. As a result, it is possible to obtain printed material suitable for the specification from the selected printing apparatus 200a. Further, the acquired printed material is suitable for the user and the attribute of the document data.

In this way, in this embodiment, the printing specification electronic job ticket is acquired, the printing apparatus information indicating the capabilities for the plurality of printing apparatuses 200a is acquired, the printing apparatus determining tree is created based on the printing history information of the printing history information table and the printing apparatus information, and the printing apparatus 200a becoming the printing destination is selected from the plurality of printing apparatuses 200a based on the acquired printing specification electronic jot ticket and printing apparatus determining tree.

Thereby, even though no printing apparatus 200a is provided that is capable of achieving the specifications for the printed material, it is possible to select the printing apparatus 200a that is capable of achieving the specifications for the printed material according to the priority order of the required printing setting.

Further, in this embodiment, the user ID is acquired, the printing history information is retrieved from the printing history information table based on the user ID, and the printing apparatus determining tree is created based on the retrieved printing history information and the printing apparatus information.

Thereby, it is possible to select the printing apparatus 200a that is capable of achieving the specifications for the printed material according to the priority order of the printing setting required by each user.

Further, in this embodiment, the document attribute information is acquired, the printing history information is retrieved from the printing history information table based on the acquired document attribute information, and the printing apparatus determining tree is created based on the retrieved printing history information and the printing apparatus information.

Thereby, it is possible to select the printing apparatus 200a that is capable of achieving the specifications for the printed material according to the priority order of the printing setting required by each attribute of document data.

Further, in this embodiment, the document data is processed based on the printing apparatus information indicating the apparatus capability of the selected printing apparatus 200a and the printing specification electronic job ticket, and the printing setting electronic job ticket including the printing setting of the selected printing apparatus 200a is created based on the printing specification electronic job ticket, and the printing is required with respect to the selected printing apparatus 200a based on the printing setting electronic job ticket and the processed document data.

Thereby, even through no single printing apparatus 200a is provided that is capable of achieving the specifications for the printed material, by the combination of the printing apparatus 200a that is capable of achieving a portion of the specifications for the printed material, the specifications for the printed material can be achieved.

In the third embodiment, the printing history information DB 10a and the storing device 62a correspond to the printing history information storing unit, and the printing specification electronic job ticket acquiring unit 12a and the Step S100a corresponds to the printing specification information acquiring unit. Further, Step S100a corresponds to the printing specification information acquiring step, the printing apparatus information acquiring unit 14a and Step S114a correspond to the printing apparatus information acquiring unit, and Step S114a corresponds to the printing apparatus information acquiring step.

In the third embodiment, the user ID acquiring unit 16a and Step S102a correspond to the user identification information acquiring unit, Step S102a corresponds to the user identification information acquiring unit, and the document attribute information acquiring unit 18a and Step S104a correspond to the document attribute information acquiring unit. Further, Step S104a corresponds to the document attribute information acquiring unit, the printing history information retrieving unit 20a and Step S106 correspond to the printing history information retrieving unit, and Step S106a corresponds to the printing history information retrieving Step.

Further, in the third embodiment, the printing apparatus determining tree creating unit 22a and Steps S108a to S112a, and S116a correspond to the printing apparatus determining tree creating unit, and Steps S108a to S112a and S116a correspond to the printing apparatus determining tree creating unit. Further, the printing apparatus selecting unit 24a and Step S118a correspond to the printing apparatus selecting unit, Step S118a corresponds to the printing apparatus selecting unit, and the document data acquiring unit 26a and Step S120a correspond to the document data acquiring unit.

In the third embodiment, Step S120a corresponds to the document data acquiring unit, the document data processing unit 28a and Step S122a correspond to the document data processing unit, and Step S122a corresponds to the document data processing unit. Further, the printing setting electronic job ticket creating unit 30a and Step S124a correspond to the printing setting information creating unit, Step S124a corresponds to the printing setting information creating unit, and the printing requiring unit 32a and Step S126a correspond to the printing requiring unit.

Further, in the third embodiment, Step S126a corresponds to the printing requiring unit, the printing specification electronic job ticket corresponds to the printing specification information, and the printing setting electronic job ticket corresponds to the printing setting information. Further, the user ID corresponds to the user identification information and the CPU 50a corresponds to an arithmetic unit.

Further, in the third embodiment, when it is not possible to select the printing apparatus 200a that is capable of achieving the specifications for the printed material (corresponds to 'not applicable' in the printing apparatus determining tree), the closest printing apparatus 200a is selected in the printing apparatus determining tree. The invention is not limited thereto. The user is informed that the optimal printing apparatus 200a does not exist, and the user is informed of the occurrence 'that if the specification fields are changed, the process can be made according to the corresponding specification', such that the user changes the specification.

Figure 23:
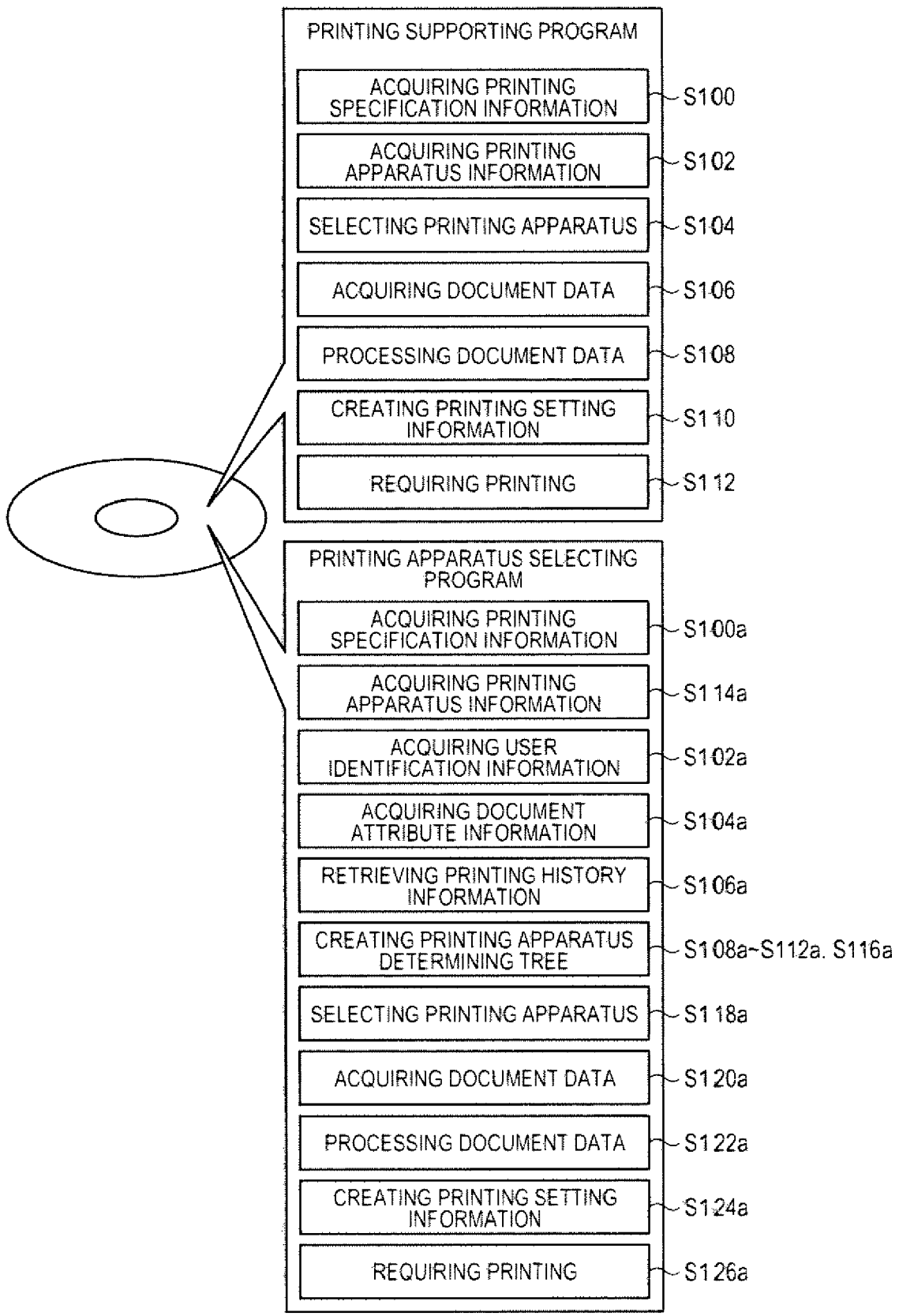
FIG. 23 is a diagram illustrating a storage medium and a data structure thereof.

Further, in the first to third embodiments, in executing the processes illustrated in the flowcharts of FIGS. 7, 8, and 19, the control program that is stored in the ROMs 52 and 52a in advance has executed. The invention is not limited thereto. As shown in FIG. 23, the program is read out from the storage medium where the program indicating this sequence is stored to the RAMs 54 and 54 so as to be executed.

FIG. 23 is a diagram illustrating a storage medium and a data structure thereof.

In this case, the storage medium corresponds to any one of a semiconductor storage medium, such as a RAM and a ROM, a magnetic storage medium, such as an FD and an HD, an optical reading storage medium, such as a CD, a CDV, an LD, a DVD, or the like, a magnetic storage/optical reading storage medium, such as an MO. If it is a computer-readable storage medium regardless of electronic, magnetic, and optical reading methods, all storage mediums can be used.

Further, in the first to third embodiments, the print support apparatus, the printing apparatus selecting apparatus, the printing support program, the printing apparatus selecting program, and the storage medium, the method of selecting the printing apparatus, the method of supporting printing, and the method of creating the printing apparatus determining tree are applied to a case in which a printing job is performed by a printing apparatuses 200 and 200a while using a printing specification electronic job ticket. The invention is not limited thereto, and various changes and modifications can be made without departing the spirit and the scope of the invention.

What is claimed is:

1. A print support apparatus that prints based on printing specification information including specifications for a printed material, comprising:
   a printing specification information acquiring unit that acquires the printing specification information;
   a printing apparatus information acquiring unit that acquires printing apparatus information indicating capabilities of a plurality of printing apparatuses;
   a printing apparatus selecting unit that selects a printing apparatus as a printing destination among the plurality of printing apparatuses based on the printing specification information acquired by the printing specification information acquiring unit and the printing apparatus information acquired by the printing apparatus information acquiring unit;
   a document data acquiring unit that acquires the/a document data associated with the printing specification information;
   a document data processing unit that processes the document data acquired by the document data acquiring unit based on printing apparatus information indicating a capability of the printing apparatus selected by the printing apparatus selecting unit and the printing specification information acquired by the printing specification information acquiring unit;
   a printing setting information creating unit that creates printing setting information including a printing setting of the printing apparatus selected by the printing apparatus selecting unit based on the printing specification information acquired by the printing specification information acquiring unit; and
   a printing requiring unit that requires printing of the printing apparatus selected by the printing apparatus selecting unit based on the printing setting information created by the printing setting information creating unit and the document data processed by the document data processing unit.

2. The print support apparatus according to claim 1, further comprising:
   a printing apparatus determining tree storing unit that stores a printing apparatus determining tree by associating a plurality of the printing settings with one another in a tree and associating the printing apparatuses with terminal nodes of the plurality of printing settings,
   wherein the printing apparatus selecting unit traces the printing apparatus determining tree based on the specifications for the printed material included in the printing specification information, and selects a printing apparatus that is associated with one of a reached node or an adjacent node thereof.

3. The print support apparatus according to claim 1, wherein the printing setting information includes a printing control instruction that controls the printing required by the printing requiring unit.

4. The print support apparatus according to claim 3, further comprising:
   a message display unit that displays a message in accordance with the printing control instruction included in the printing setting information; and a confirmation input unit that inputs confirmation of the message, wherein when the confirmation is inputted by the confirmation input unit, the printing requiring unit requires the printing apparatus to perform printing.

5. A computer readable storage medium that stores the print support program that supports printing based on printing specification information including specifications for a printed material, the program selectively causing a computer to execute the steps of:

acquiring the printing specification information;

acquiring printing apparatus information indicating capabilities of a plurality of printing apparatuses;

selecting a printing apparatus as a printing destination among the plurality of printing apparatuses based on the acquired printing specification information and the acquired printing apparatus information;

acquiring document data associated with the printing specification information;

processing the document data acquired based on printing apparatus information indicating a capability of the selected printing apparatus and the acquired printing specification information;

creating printing setting information including a printing setting of the selected printing apparatus based on the acquired printing specification information; and requiring printing of the selected printing apparatus based on the created printing setting information and the processed document data.

6. A printing apparatus selecting apparatus that selects a printing apparatus as a printing destination among a plurality of printing apparatuses, comprising:

a printing history information storing unit that stores printing history information, the printing history information indicating a history of printing performed based on printing specification information including specifications of a printed material and printing setting information including a printing setting of the printing apparatus, the printing history information including the specifications for the printed material and the printing setting;

a printing specification information acquiring unit that acquires the printing specification information;

a printing apparatus information acquiring unit that acquires printing apparatus information indicating capabilities of the plurality of printing apparatuses;

a printing apparatus determining tree creating unit that creates a printing apparatus determining tree by associating a plurality of the printing settings with one another in a tree and associating the printing apparatuses with terminal nodes of the plurality of printing settings based on the printing history information stored by the printing history information storing unit and the printing apparatus information acquired by the printing apparatus information acquiring unit; and a printing apparatus selecting unit that selects the printing apparatus as the printing destination among the plurality of printing apparatuses based on the printing specification information acquired by the printing specification information acquiring unit and the printing apparatus determining tree created by the printing apparatus determining tree creating unit.

7. The printing apparatus selecting apparatus according to claim 6, further comprising:

a user identification information acquiring unit that acquires user identification information corresponding to the printing specification information; and a printing history information retrieving unit that retrieves the printing history information from the printing history information storing unit based on the user identification information acquired by the user identification information acquiring unit, wherein the printing history information includes the user identification information for identifying users, and the printing apparatus determining tree creating unit creates the printing apparatus determining tree based on the printing history information retrieved by the printing history information retrieving unit and the printing apparatus information.

8. The printing apparatus selecting apparatus according to claim 6, further comprising:

a document attribute information acquiring unit that acquires document attribute information corresponding to the printing specification information; and a printing history information retrieving unit that retrieves the printing history information from the printing history information storing unit based on the document attribute information acquired by the document attribute information acquiring unit, wherein the printing history information includes the document attribute information indicating an attribute of the document data, and the printing apparatus determining tree creating unit creates the printing apparatus determining tree based on the printing history information retrieved by the printing history information retrieving unit and the printing apparatus information.

9. The printing apparatus selecting apparatus according to claim 6, wherein the printing apparatus selecting unit traces the printing apparatus determining tree based on the specifications for the printed material included in the printing specification information, and selects a printing apparatus that is associated with one of a reached node and an adjacent node thereof.

10. A print support apparatus that prints using a plurality of printing apparatuses, comprising:

a printing history information storing unit that stores printing history information, the printing history information indicating a history of printing performed based on printing specification information including a specifications for a printed material and printing setting information including a printing setting of the printing apparatus, the printing history information including the specifications for the printed material and the printing setting;

a printing specification information acquiring unit that acquires the printing specification information;

a printing apparatus information acquiring unit that acquires printing apparatus information indicating capabilities of the plurality of printing apparatuses;

a printing apparatus determining tree creating unit that creates a printing apparatus determining tree by associating a plurality of the printing settings with one another in a tree and associating the printing apparatuses with terminal nodes of the plurality of printing settings based on the printing history information stored by the printing history information storing unit and the printing apparatus information acquired by the printing apparatus information acquiring unit;

a printing apparatus selecting unit that selects the printing apparatus as the printing destination among the plurality of printing apparatuses based on the printing specification information acquired by the printing specification information acquiring unit and the printing apparatus determining tree created by the printing apparatus determining tree creating unit;

a document data acquiring unit that acquires the/a document data associated with the printing specification information;

a document data processing unit that processes the document data acquired by the document data acquiring unit based on printing apparatus information indicating a capability of the printing apparatus selected by the printing apparatus selecting unit and the printing specification information acquired by the printing specification information acquiring unit;

a printing setting information creating unit that creates printing setting information including a printing setting of the printing apparatus selected by the printing apparatus selecting unit based on the printing specification information acquired by the printing specification information acquiring unit; and a printing requiring unit that requires printing of the printing apparatus selected by the printing apparatus selecting unit based on the printing setting information created by the printing setting information creating unit and the document data processed by the document data processing unit.

11. A computer readable storage medium that stores the printing apparatus selecting program that selects a printing apparatus as a printing destination among a plurality of printing apparatuses, the program selectively causing a computer to execute the steps of:

acquiring printing specification information including specifications for a printed material;

acquiring printing apparatus information indicating capabilities of the plurality of printing apparatuses;

creating a printing apparatus determining tree by associating a plurality of printing settings with one another in a tree and associating the printing apparatuses with terminal nodes of the plurality of printing settings based on printing history information of a printing history information storing unit and the acquired printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; and selecting the printing apparatus as the printing destination among the plurality of printing apparatuses based on the acquired printing specification information and the created printing apparatus determining tree.

12. A computer readable storage medium that stores the print support program that prints using a plurality of printing apparatuses, the program selectively causing a computer to execute the steps of:

acquiring printing specification information including specifications for a printed material;

acquiring printing apparatus information indicating capabilities of the plurality of printing apparatuses;

creating a printing apparatus determining tree by associating a plurality of printing settings with one another in a tree and associating the printing apparatuses with terminal nodes of the plurality of printing settings based on printing history information of a printing history information storing unit and the acquired printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting;

selecting a printing apparatus as a printing destination among the plurality of printing apparatuses based on the acquired printing specification information and the created printing apparatus determining tree;

acquiring the/a document data associated with the printing specification information;

processing the acquired document data based on printing apparatus information indicating a capability of the selected printing apparatus and the acquired printing specification information;

creating printing setting information including a printing setting of the selected printing apparatus based on the acquired printing specification information; and requiring printing of the selected printing apparatus based on the created printing setting information and the processed document data.

13. A method of selecting a printing apparatus as a printing destination among a plurality of printing apparatuses, the method comprising:

acquiring printing specification information including specifications for a printed material;

acquiring printing apparatus information indicating capabilities of the plurality of printing apparatuses;

creating a printing apparatus determining tree by associating a plurality of printing settings with one another in a tree and associating the printing apparatuses with terminal nodes of the plurality of printing settings based on printing history information of a printing history information storing unit and the acquired printing apparatus information, the printing history information storing unit storing the printing history information, the printing history information indicating a history of printing performed based on the printing specification information and the printing setting information including the printing setting of the printing apparatus, the printing history information including the specifications for the printed material included in the printing specification information and the printing setting; and selecting the printing apparatus as the printing destination among the plurality of printing apparatuses based on the acquired printing specification information and the created printing apparatus determining tree.

14. The method of selecting a printing apparatus as a printing destination among a plurality of printing apparatuses of claim 13 wherein the method is performed by an operation unit.

* * * * *